United States Patent
Ochida et al.

(10) Patent No.: US 11,511,761 B2
(45) Date of Patent: Nov. 29, 2022

(54) VEHICLE CONTROL SYSTEM AND VEHICLE CONTROL METHOD

(71) Applicant: HONDA MOTOR CO., LTD., Tokyo (JP)

(72) Inventors: Jun Ochida, Wako (JP); Tadahiko Kanoh, Wako (JP); Takuji Hiroma, Wako (JP); Kanta Tsuji, Wako (JP); Takuyuki Mukai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 88 days.

(21) Appl. No.: 16/616,518

(22) PCT Filed: Jun. 2, 2017

(86) PCT No.: PCT/JP2017/020565
§ 371 (c)(1),
(2) Date: Nov. 25, 2019

(87) PCT Pub. No.: WO2018/220811
PCT Pub. Date: Dec. 6, 2018

(65) Prior Publication Data
US 2021/0163026 A1 Jun. 3, 2021

(51) Int. Cl.
*B60W 50/029* (2012.01)
*B60W 30/18* (2012.01)
*B60W 50/035* (2012.01)

(52) U.S. Cl.
CPC .... *B60W 50/029* (2013.01); *B60W 30/18163* (2013.01); *B60W 50/035* (2013.01)

(58) Field of Classification Search
CPC ......... B60W 50/029; B60W 30/18163; B60W 50/035; B60W 2050/0006; B60W 50/023;
(Continued)

(56) References Cited

U.S. PATENT DOCUMENTS

2008/0208426 A1* 8/2008 Iwasaki ................ B60T 17/221
701/70
2012/0253614 A1* 10/2012 Hiroya ............... B60K 23/0808
701/51

(Continued)

FOREIGN PATENT DOCUMENTS

CN 102514477 6/2012
CN 102574543 7/2012
(Continued)

OTHER PUBLICATIONS

International Search Report and Written Opinion for International Application Serial No. PCT/JP2017/020565 dated Aug. 22, 2017, 8 pages.

(Continued)

*Primary Examiner* — Muhammad Shafi
(74) *Attorney, Agent, or Firm* — Amin, Turocy & Watson, LLP

(57) ABSTRACT

A vehicle control system includes a first actuator that is configured to perform at least any of driving, braking, or steering of a host vehicle, a first controller that is configured to perform traveling control of the host vehicle by controlling the first actuator, a second actuator that is configured to perform at least any of driving, braking, or steering of the host vehicle, a second controller that is configured to perform traveling control of the host vehicle by controlling the second actuator, and a communication line that is interposed between the first controller and the second controller. The first controller is configured to determine whether an operating state of the first actuator satisfies a predetermined condition, and limit, in a case where it is determined that the operating state of the first actuator satisfies the predetermined condition, control of the first actuator as compared to a case where it is determined that the predetermined condition is not satisfied, and transmits a predetermined signal to (Continued)

the second controller through the communication line, and in a case where the predetermined signal is received from the first controller through the communication line, the second controller performs traveling control of the host vehicle in place of at least a portion of a function of the first controller by controlling the second actuator.

4 Claims, 11 Drawing Sheets

(58) Field of Classification Search
CPC ..... B60W 60/0015; B60W 2050/0215; B60W 2050/022; B60W 2050/0297; B60W 50/0205
USPC .......................................................... 701/29.2
See application file for complete search history.

(56) References Cited

U.S. PATENT DOCUMENTS

| 2014/0229064 | A1 | 8/2014 | Arnold et al. | |
| 2015/0051778 | A1 | 2/2015 | Mueller | |
| 2018/0050692 | A1* | 2/2018 | Kim | B60W 10/06 |
| 2018/0052470 | A1* | 2/2018 | Kim | B60W 10/184 |
| 2018/0229727 | A1* | 8/2018 | Kelly | F16H 63/50 |
| 2018/0326848 | A1* | 11/2018 | Inomata | B60W 40/072 |
| 2019/0152524 | A1* | 5/2019 | Fujita | G01D 5/14 |
| 2019/0329766 | A1* | 10/2019 | Ishioka | B60W 30/095 |
| 2020/0127586 | A1* | 4/2020 | Chretien | H02K 47/20 |

FOREIGN PATENT DOCUMENTS

| CN | 105073542 | 11/2015 |
| CN | 106394521 | 2/2017 |
| JP | 2008-207662 | 9/2008 |
| JP | 2012-071622 | 4/2012 |
| JP | 2013-071549 | 4/2013 |
| JP | 2013-095379 | 5/2013 |
| JP | 2016-199239 | 12/2016 |
| JP | 2017-047709 | 3/2017 |

OTHER PUBLICATIONS

Japanese Office Action for Japanese Patent Application No. 2019-521891 dated Jan. 12, 2021.
Chinese Office Action for Chinese Patent Application No. 201780091250.2 dated Apr. 18, 2022.
Chinese Office Action for Chinese Patent Application No. 201780091250.2 dated Aug. 5, 2022.

* cited by examiner

VEHICLE CONTROL SYSTEM AND VEHICLE CONTROL METHOD

TECHNICAL FIELD

The present invention relates to a vehicle control system and a vehicle control method.

BACKGROUND ART

Since the past, a technique in which a primary central processing unit (CPU) controls fluid pressure within wheel cylinders of a left front wheel and a right rear wheel of a vehicle, a secondary CPU controls fluid pressure within wheel cylinders of a right front wheel and a left rear wheel of the vehicle, and in a case where an abnormality has occurred in one CPU, the other CPU controls a control target to be controlled by a CPU on a side where the abnormality originally occurred has been known (see, for example, Patent Document 1).

PRIOR ART DOCUMENTS

Patent Documents

[Patent Document 1]
Japanese Unexamined Patent Application, First Publication No. 2008-207662

SUMMARY OF INVENTION

Problems to be Solved by the Invention

However, in the related art, a redundant configuration of a system that performs traveling control of a host vehicle such as autonomous driving or driving assistance has not been fully considered.

The present invention was contrived in view of such circumstances, and one object thereof is to provide a vehicle control system and a vehicle control method that make it possible to continue traveling control stably using a redundant configuration.

Solution to Problem (1) A vehicle control system includes: a first actuator that is configured to perform at least any of driving, braking, or steering of a host vehicle; a first controller that is configured to perform traveling control of the host vehicle by controlling the first actuator; a second actuator that is configured to perform at least any of driving, braking, or steering of the host vehicle; a second controller that is configured to perform traveling control of the host vehicle by controlling the second actuator; and a communication line that is interposed between the first controller and the second controller, wherein the first controller is configured to determine whether an operating state of the first actuator satisfies a predetermined condition, and limit, in a case where it is determined that the operating state of the first actuator satisfies the predetermined condition, control of the first actuator as compared to a case where it is determined that the predetermined condition is not satisfied, and transmit a predetermined signal to the second controller through the communication line, and wherein, in a case where the predetermined signal is received from the first controller through the communication line, the second controller performs traveling control of the host vehicle in place of at least a portion of a function of the first controller by controlling the second actuator.

(2) In the vehicle control system according to (1), the first actuator includes two or more driving actuators that are configured to drive the host vehicle, a braking actuator that brakes the host vehicle, and a steering actuator that is configured to steer the host vehicle, and in a case where it is determined that an operating state of any of the actuators included in the first actuator satisfies the predetermined condition, the first controller is configured to limit an operation of the first actuator as compared to a case where it is determined that operating states of all the actuators included in the first actuator do not satisfy the predetermined condition.

(3) In the vehicle control system according to (1) or (2), in a case where the predetermined signal is not received from the first controller through the communication line, the second controller is configured to limit an operation of the second actuator having a function that is the same as that of the first actuator which is controlled by the first controller.

(4) In the vehicle control system according to any one of (1) to (3), a first power supply that is configured to supply power to the first actuator and a second power supply that is different from the first power supply, the second power supply supplying power to the second actuator are further included, and the second actuator includes two or more driving actuators that are configured to drive the host vehicle, a braking actuator that brakes the host vehicle, and a steering actuator that is configured to steer the host vehicle.

(5) In the vehicle control system according to any one of (1) to (4), a detector that is configured to determine behavior of the host vehicle and a behavior suppressor that is configured to suppress the behavior of the host vehicle by controlling the first actuator or the second actuator in accordance with the behavior detected by the detector are further included, and the first controller is configured to stop control of the first actuator in a case where the first actuator is controlled by the behavior suppressor, or the second controller is configured to stop control of the second actuator in a case where the second actuator is controlled by the behavior suppressor.

(6) A vehicle control system includes: a first controller that is configured to perform traveling control of a host vehicle; a first acquirer that is configured to acquire information relating to traveling control performed by the first controller; a second controller that is configured to perform traveling control of the host vehicle; a second acquirer that is configured to acquire information relating to traveling control performed by the second controller; and a communication line that is interposed between the first controller and the second controller, wherein the first controller is configured to determine whether a state of the host vehicle relating to traveling control satisfies a predetermined condition on the basis of the information acquired by the first acquirer, and limit, in a case where it is determined that the state of the host vehicle satisfies the predetermined condition, the traveling control as compared to a case where it is determined that the predetermined condition is not satisfied, and transmits a predetermined signal to the second controller through the communication line, and wherein, in a case where the predetermined signal is received from the first controller through the communication line, the second controller performs traveling control of the host vehicle in place of at least a portion of a function of the first controller on the basis of the information acquired by the second acquirer.

(7) In the vehicle control system according to (6), the first acquirer acquires some or all of information relating to a surrounding environment of the host vehicle, information relating to a traveling condition of the host vehicle, and information relating to a driving operation performed by an occupant of the host vehicle, the first controller is configured to determine whether the state of the host vehicle satisfies the predetermined condition on the basis of the information acquired by the first acquirer, and the information acquired by the first acquirer is transmitted to the second controller side in a case where the state of the host vehicle satisfies the predetermined condition, and is not transmitted to the second controller side in a case where the state of the host vehicle does not satisfy the predetermined condition.

(8) A vehicle control method includes causing a first in-vehicle computer to: perform traveling control of a host vehicle by controlling a first actuator that is configured to perform at least any of driving, braking, or steering of the host vehicle; determine whether an operating state of the first actuator satisfies a predetermined condition; and limit, in a case where it is determined that the operating state of the first actuator satisfies the predetermined condition, control of the first actuator as compared to a case where it is determined that the predetermined condition is not satisfied, and transmit a predetermined signal to a second in-vehicle computer connected to a communication line that is interposed between the first in-vehicle computer and the second in-vehicle computer through the communication line, the method further including causing the second in-vehicle computer to perform traveling control of the host vehicle by controlling a second actuator that is configured to perform at least any of driving, braking, or steering of the host vehicle, and perform traveling control of the host vehicle in place of at least a portion of a function of the first in-vehicle computer by controlling the second actuator that is configured to perform at least any of driving, braking, or steering of the host vehicle in a case where the predetermined signal is received from the first in-vehicle computer through the communication line.

(9) A vehicle control method includes causing a first in-vehicle computer to: perform traveling control of a host vehicle; acquire information relating to traveling control of the host vehicle; determine whether a state of the host vehicle relating to traveling control satisfies a predetermined condition on the basis of the acquired information; and limit, in a case where it is determined that the state of the host vehicle satisfies the predetermined condition, the traveling control as compared to a case where it is determined that the predetermined condition is not satisfied, and transmit a predetermined signal to a second in-vehicle computer connected to a communication line that is interposed between the first in-vehicle computer and the second in-vehicle computer through the communication line, the method further including causing the second in-vehicle computer to acquire information relating to traveling control of the host vehicle, and perform traveling control of the host vehicle in place of at least a portion of a function of the first in-vehicle computer on the basis of the acquired information in a case where the predetermined signal is received from the first in-vehicle computer through the communication line.

Advantageous Effects of Invention

According to any of (1) to (9), in a case where it is determined that the operating state of the first actuator satisfies the predetermined condition, the first controller is configured to limit control of the first actuator as compared to a case where it is determined that the predetermined condition is not satisfied, and transmits the predetermined signal to the second controller through the communication line, and the second controller controls the second actuator in a case where the predetermined signal is received from first controller through the communication line, whereby a redundant configuration is taken so as to perform traveling control of the host vehicle in place of at least a portion of a function of the first controller, and thus it is possible to continue the traveling control stably.

DESCRIPTION OF EMBODIMENTS

Hereinafter, an embodiment of a vehicle control system and a vehicle control method of the present invention will be described with reference to the accompanying drawings.

[Overall Configuration]

Figure 1:
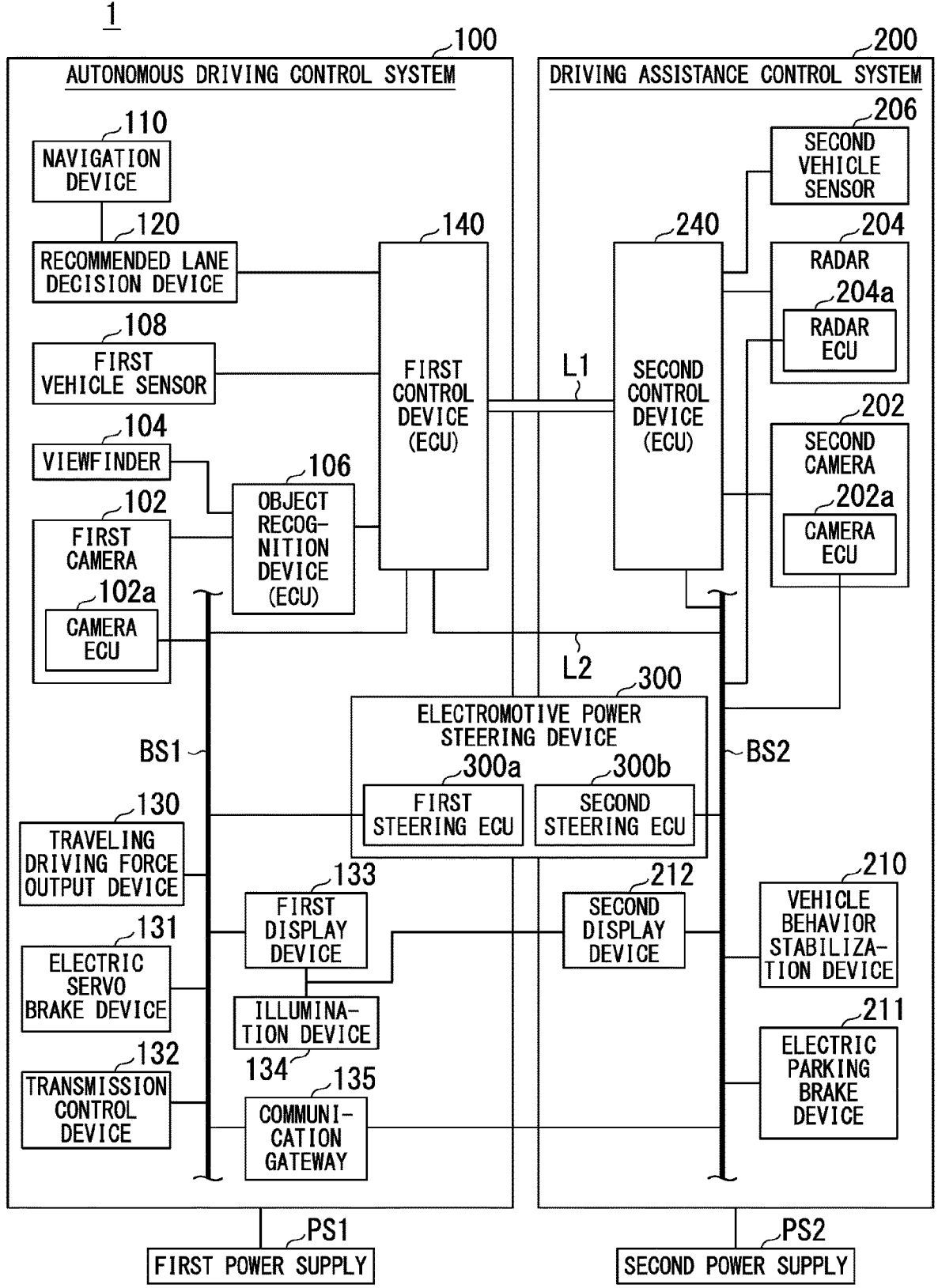
FIG. 1 is a configuration diagram of a vehicle control system 1 of an embodiment.

FIG. 1 is a configuration diagram of a vehicle control system 1 of an embodiment. A vehicle having the vehicle control system 1 mounted therein (hereinafter referred to as a host vehicle M) is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle control system 1 includes, for example, an autonomous driving control system 100, a driving assistance control system 200, a first power supply PS1 that is configured to supply power to the autonomous driving control system 100, and a second power supply PS2 that is configured to supply power to the driving assistance control system 200. The autonomous driving control system 100 and the driving assistance control system 200 have a redundant configuration in order to take charge of a function of one system alternately. In addition, the first power supply PS1 and the second power supply PS2 are provided independently of each other.

[Configuration on Autonomous Driving Control System Side]

The autonomous driving control system 100 includes, for example, a first camera 102, a viewfinder 104, an object recognition device 106, a first vehicle sensor 108, a navigation device 110, a recommended lane decision device 120, a traveling driving force output device 130, an electric servo brake device 131, a transmission control device 132, a first display device 133, an illumination device 134, a communication gateway 135, a first steering ECU 300a for driving an electric motor of an electromotive power steering device 300, and a first control device 140. One of the first control device 140 and a second control device 240 to be described later is an example of a "first controller," and the other is an example of a "second controller." In addition, a combination of the first camera 102, the viewfinder 104, the object recognition device 106, the first vehicle sensor 108, the recommended lane decision device 120, and an operation detector of a driving operator to be described later is an example of a "first acquirer" or a "second acquirer."

The traveling driving force output device 130, the electric servo brake device 131, the transmission control device 132, the first display device 133, the communication gateway 135, the first steering ECU 300a, and the first control device 140 are connected to one another through a first common bus BS1, and other sensors or devices are connected to one another through another communication line. The first bus BS1 or another communication line is a multiplex communication line or a serial communication line such as a controller area network (CAN) communication line. In addition, the first control device 140 is also connected to a second bus BS2 to be described later.

The first camera 102 is a digital camera using a solid-state imaging element such as, for example, a charge coupled device (CCD) or a complementary metal oxide semiconductor (CMOS). The first camera 102 is installed at any points on the host vehicle M. In a case where a forward image is captured, the first camera 102 is installed on the upper portion of the front windshield, the rear surface of the rear-view mirror, or the like. The first camera 102, for example, repeatedly captures an image of the vicinity of the host vehicle M periodically. The first camera 102 may be a stereo camera.

In addition, the first camera 102 includes, for example, a camera electronic controller (ECU) 102a. The camera ECU 102a includes one or more microcontrollers. The camera ECU 102a controls various devices connected to the first bus BS1 separately from control performed by the first control device 140. The specific content of control will be described later.

The viewfinder 104 is a light detection and ranging or laser imaging detection and ranging (LIDAR) finder that measures scattered light with respect to irradiation light and detects a distance to an object. The viewfinder 104 is installed on, for example, a vehicle front end side such as a front grill, a front bumper, or the inside of a headlight, a vehicle rear end side such as a trunk lid, or a vehicle lateral end side such as the vicinity of a side mirror or a side light. In addition, the viewfinder 104 may be installed on a hood, a roof or the like.

The object recognition device 106 is realized by, for example, an ECU including one or more microcontrollers. The object recognition device 106 recognizes, for example, the position, type, speed, movement direction, or the like of a nearby vehicle by performing a sensor fusion process on each detection result of the first camera 102 and the viewfinder 104. Meanwhile, the object recognition device 106 may recognize an object of a type such as a guardrail, a telephone pole, or a pedestrian in addition to a nearby vehicle.

The object recognition device 106 repeatedly acquires information indicating a detection result from each sensor in each detection period of the first camera 102 and the viewfinder 104 or a period longer than this detection period, and recognizes the position, type, speed, movement direction, or the like of an object such as a nearby vehicle. The object recognition device 106 outputs information indicating a recognition result to the first control device 140.

The first vehicle sensor 108 includes, for example, a vehicle speed sensor that detects the speed of the host vehicle M, an acceleration sensor that detects an acceleration, an yaw rate sensor that detects an angular velocity around a vertical axis, an orientation sensor that detects the direction of the host vehicle M, or the like. The first vehicle sensor 108 outputs information indicating a detection result to the first control device 140.

Figure 2:
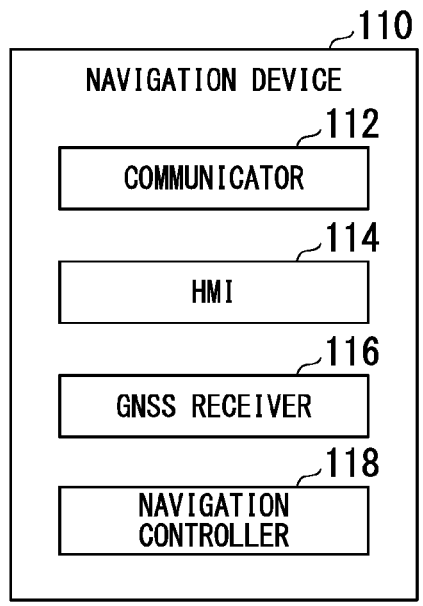
FIG. 2 is a configuration diagram of a navigation device 110.

The navigation device 110 decides, for example, a route to a destination which is set by an occupant. FIG. 2 is a configuration diagram of the navigation device 110. The navigation device 110 includes, for example, a communicator 112, a human machine interface (HMI) 114, a global navigation satellite system (GNSS) receiver 116, and a navigation controller 118.

The communicator 112 communicates with a navigation server through a wireless base station using, for example, a cellular network, a Wi-Fi network, Bluetooth (registered trademark), dedicated short range communication (DSRC), or the like.

The HMI 114 includes, for example, a touch panel-type display device, a speaker, a microphone, a switch, a button, or the like. The GNSS receiver 116 measures its position (the position of the host vehicle M) on the basis of radio waves arriving from a GNSS satellite (for example, a GPS satellite). The navigation controller 118 includes, for example, a CPU or various storage devices, and controls the entirety of the navigation device 110. A navigation map (map information) is stored in the storage device. The navigation map is a map in which roads are represented using nodes and links.

The navigation controller 118 refers to the navigation map to decide a route to a destination designated using the HMI 114 from the position of the host vehicle M measured by the GNSS receiver 116. In addition, the navigation controller 118 may transmit the position and destination of the host vehicle M to a navigation server (not shown) using the communicator 112, and acquire a route sent back from the navigation server.

FIG. 1 will be described again. The recommended lane decision device 120 includes, for example, a micro processing unit (MPU) and various storage devices. High-accuracy map information which is more detailed than the navigation map is stored in the storage device. The high-accuracy map information includes, for example, information such as a road width or gradient for each lane, curvature, the positions of merging and divergence points, or a reference speed (for example, a legal speed). The recommended lane decision device 120 decides a preferred recommended lane in order to travel along a route which is input from the navigation device 110, and outputs the information relating to a route having a recommended lane decided therein (a portion of high-accuracy map information) to the first control device 140.

The traveling driving force output device 130 outputs a traveling driving force (torque) for the host vehicle M to travel to a driving wheel. The traveling driving force output device 130 includes, for example, a combination of an internal-combustion engine, an electric motor, a transmission or the like, and a power ECU that controls these components. The power ECU controls the above components in accordance with information which is input from the first control device 140 and the camera ECU 102a or information which is input from a driving operator (not shown).

For example, an operation detector that detects the amount of operation of each operator is installed on the driving operator. The operation detector detects the amount of stepping of an accelerator pedal or a brake pedal, the position of a shift lever, the steering angle of a steering wheel, or the like. The operation detector outputs a detection signal indicating the detected amount of operation of each operator to the autonomous driving control system 100, or one or both of the traveling driving force output device 130, the electric servo brake device 131, the transmission control device 132, and the electromotive power steering device 300.

The power ECU controls, for example, an ignition plug to thereby adjust a timing at which fuel supplied to an internal-combustion engine is ignited. In addition, the power ECU supplies, for example, power to a solenoid provided in a fuel injector and drives a plunger passed through the solenoid to thereby adjust fuel injected into an internal-combustion engine by the fuel injector. In addition, the power ECU controls, for example, an actuator that changes the opening degree of a throttle valve to thereby adjust the flow rate of outside air supplied to an internal-combustion engine. In addition, the power ECU controls, for example, an electric motor to thereby adjust the amount of power generation.

The electric servo brake device 131 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the first control device 140 or the camera ECU 102a or the information which is input from the driving operator, and causes a brake torque according to a braking operation to be output to each wheel. The electric servo brake device 131 may include a mechanism that transfers hydraulic pressure generated by the operation of a brake pedal included in the driving operator to the cylinder through a master cylinder as a backup. Meanwhile, the electric servo brake device 131 is not limited to the above-described configuration, and may be an electronic control type hydraulic brake device that controls an actuator in accordance with the information which is input from the first control device 140 or the camera ECU 102a and transfers hydraulic pressure of the master cylinder to the cylinder.

The transmission control device 132 includes, for example, a range change mechanism that changes a shift range by switching a combination of gears of a transmission included in the traveling driving force output device 130, an actuator such as a motor that drives the range change mechanism, and a transmission control ECU that controls this actuator. For example, the transmission control ECU controls the actuator in accordance with the information which is input from the first control device 140 or the camera ECU 102a to drive the range change mechanism, and changes a shift range to a parking range by fixing a driving shaft inside the transmission.

The first display device 133 is, for example, a head-up display (HUD) that projects an image onto a front windshield.

The illumination device 134 switches various lamps such as, for example, a headlamp, a tail lamp, a turn signal lamp (a hazard lamp), or an LED lamp installed on a side mirror to a turn-on state or a turn-off state, or controls the illumination direction (beam direction) of light radiated from a headlamp. The illumination device 134 is connected to a second display device 212 of the driving assistance control system 200 to be described later through a predetermined communication line at a distance between the systems.

The communication gateway 135 is, for example, a device that includes a processor such as a CPU, a microcontroller, or various storage devices, and relays the first bus BS1 and the second bus BS2 to be described later. For example, in a case where a communication protocol of the first bus BS1 and a communication protocol of the second bus BS2 are different from each other, the communication gateway 135 converts information received from one bus in accordance with a communication protocol of the other bus and then transmits the converted information to the other bus. In addition, the communication gateway 135 performs mediation in a case where information is already transmitted to a bus of a transmission destination when the information is transmitted from one bus to the other bus. For example, in a case where the bus of a transmission destination is the first bus BS1, and the first control device 140 has a right to access the first bus BS1, the communication gateway 135 transmits a request for information transmission to the first control device 140, and transmits the information received from the second bus BS2 to the first bus BS1 in a case where a response of permission is received from the first control device 140.

The first steering ECU 300a drives an electric motor included in the electromotive power steering device 300. The electromotive power steering device 300 includes, for example, a steering wheel, an electric motor, the first steering ECU 300a, and a second steering ECU 300b to be described later. The electric motor is provided with, for example, two different stators with respect to one common rotor. The first steering ECU 300a drives the electric motor that rotates the rotor by controlling an inverter connected to one of the two stators. In this case, the first steering ECU 300a drives the electric motor with the amount of operation according to steering angle of the steering wheel. The electric motor changes the direction of a turning wheel, for example, by causing a force to act on a rack and pinion mechanism.

[Configuration of First Control Device]

Hereinafter, the configuration of the first control device 140 will be described. The first control device 140 includes one or more processors such as a CPU or an MPU, and a storage device such as an HDD, a flash memory, a random access memory (RAM), or a read only memory (ROM), and executes various processes. In addition, the first control device 140 is connected to, for example, the second control device 240 through a first communication line L1 of an Ethernet (registered trademark) standard. Meanwhile, the first communication line L1 is not limited to the Ethernet standard, and may be based on a standard in which a transmission speed is relatively fast.

Figure 3:
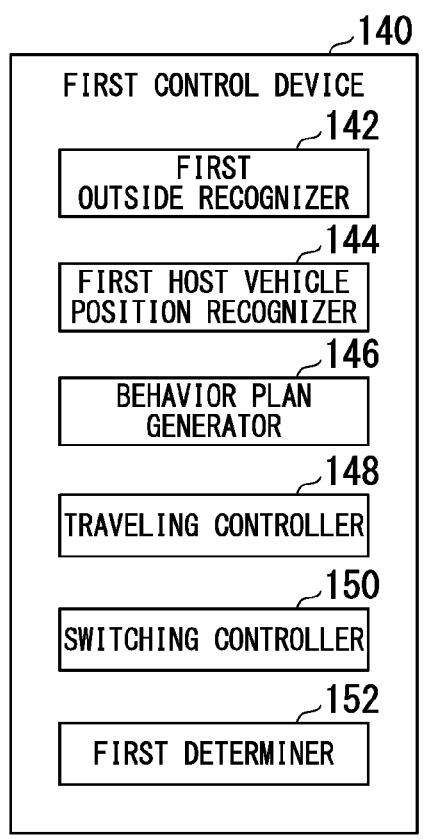
FIG. 3 is a configuration diagram of a first control device 140.

FIG. 3 is a configuration diagram of the first control device 140. The first control device 140 includes, for example, a first outside recognizer 142, a first host vehicle position recognizer 144, a behavior plan generator 146, a traveling controller 148, a switching controller 150, and a first determiner 152. Some or all of these components are realized by, for example, a processor executing programs (software) stored in a storage device. In addition, some or all of these components may be realized by hardware such as a large scale integration (LSI), an application specific integrated circuit (ASIC), or a field-programmable gate array (FPGA), or may be realized by software and hardware in cooperation.

The first outside recognizer 142 recognizes, for example, states of the position, speed, acceleration and the like of an object such as a nearby vehicle on the basis of the information which is input from the first camera 102 and the viewfinder 104 through the object recognition device 106. The "state" of an object may include the acceleration, jerk or the like of the object. In addition, in a case where an object is a nearby vehicle, the "state" of the object may include, for example, a behavior state such as whether the nearby vehicle performs or attempts to perform a lane change.

In addition, the first outside recognizer 142 may acquire detection results of a second camera 202 and a radar 204 on the driving assistance control system 200 side through the first communication line L1, and recognize states of the position, speed, acceleration and the like of an object such as a nearby vehicle.

The first host vehicle position recognizer 144 recognizes, for example, a traveling lane in which the host vehicle M is currently traveling, and the relative position and posture of the host vehicle M with respect to the traveling lane. The first host vehicle position recognizer 144 refers to, for example, high-accuracy map information indicated by a route in which a recommended lane is decided by the recommended lane decision device 120 and compares a pattern of a road division line (for example, an array of solid lines and broken lines) of the route in which the recommended lane is decided with a pattern of a road division line located in the vicinity of the host vehicle M which is recognized from an image captured by the first camera 102, to thereby recognize which of one or more lanes included in the route is a traveling lane. The first host vehicle position recognizer 144 recognizes, for example, the position and posture of the host vehicle M with respect to a traveling lane.

Figure 4:
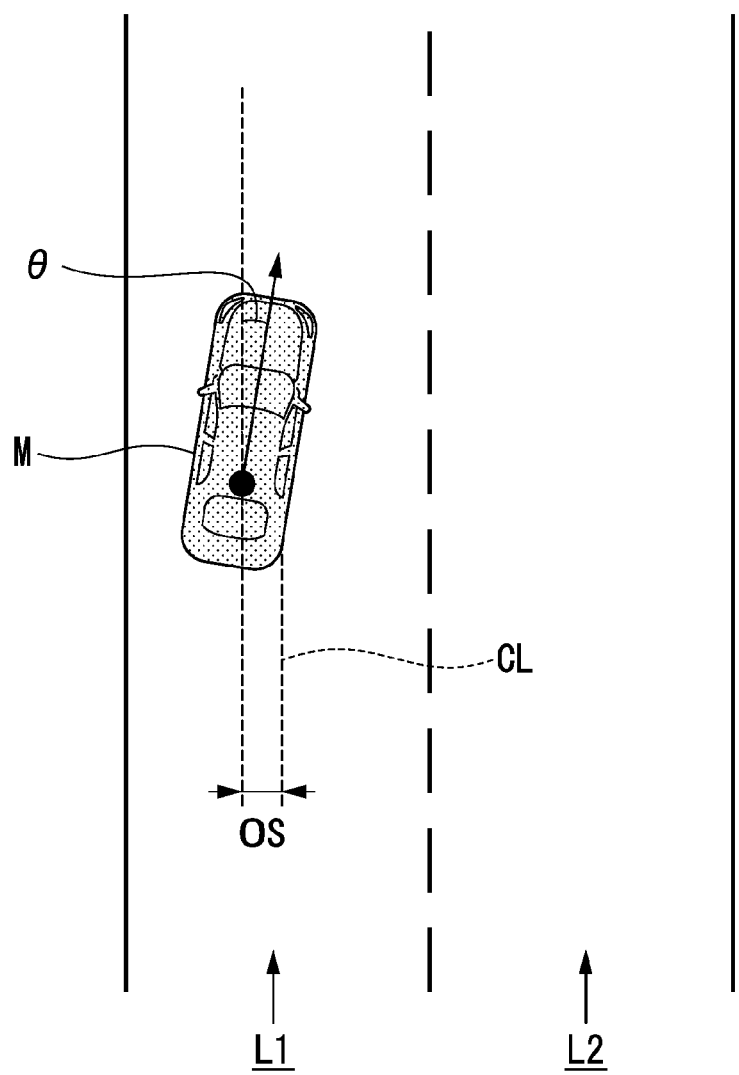
FIG. 4 is a diagram showing a status in which the relative position and posture of a host vehicle M with respect to a traveling lane L1 are recognized by a first host vehicle position recognizer 144.

FIG. 4 is a diagram showing a status in which the relative position and posture of the host vehicle M with respect to a traveling lane L1 is recognized by the first host vehicle position recognizer 144. The first host vehicle position recognizer 144 recognizes, for example, an angle θ to a line that links deviation OS of a reference point (for example, centroid) of the host vehicle M from a traveling lane center CL to the traveling lane center CL in the traveling direction of the host vehicle M as the relative position and posture of the host vehicle M with respect to the traveling lane L1. Meanwhile, instead, the first host vehicle position recognizer 144 may recognize the position of the reference point of the host vehicle M or the like with respect to either side end portion of the traveling lane L1 as the relative position of the host vehicle M with respect to the traveling lane. The relative position of the host vehicle M which is recognized by the first host vehicle position recognizer 144 is provided to the recommended lane decision device 120 and the behavior plan generator 146.

The behavior plan generator 146 decides events which are sequentially executed in autonomous driving so as to travel in a recommended lane decided by the recommended lane decision device 120 and to be capable of coping with the surrounding situation of the host vehicle M. Examples of the events include a lane keeping event of simply keeping a lane, a constant speed traveling event of traveling in the same traveling lane at a constant speed, a lane change event of changing a traveling lane of the host vehicle M, a passing event of passing a preceding vehicle, a following traveling event of traveling following a preceding vehicle, a merging event of causing a vehicle to merge at a merging point, a divergence event of causing the host vehicle M to proceed to a objective lane at a divergence point of a road, an emergency stop event of urgently stopping the host vehicle M, a switching event for terminating autonomous driving and switching to manual driving, and the like. In addition, during execution of these events, behavior for avoidance may be planned on the basis of the surrounding situation (such as the presence of a nearby vehicle or a pedestrian, or lane narrowing caused by road construction) of the host vehicle M.

The behavior plan generator 146 generates a target trajectory when the host vehicle M will travel in the future in a route decided by a route decider 53 on the basis of decided events (a set of a plurality of events planned in accordance with a route). The target trajectory is represented as a trajectory obtained by arranging points (hereinafter referred to as trajectory points) at which the host vehicle M will arrive in order. The trajectory point is a point to be reached by the host vehicle M for each predetermined traveling distance, and aside from this, a target speed for each predetermined sampling time (for example, approximately several tenths of a [sec]) is decided as a portion of the target trajectory (an element). The target speed may include an element such as target acceleration or target jerk. In addition, the trajectory point may be a position, for each predetermined sampling time, to be reached by the host vehicle M at the sampling time. In this case, the target speed is decided by an interval between trajectory points.

Figure 5:
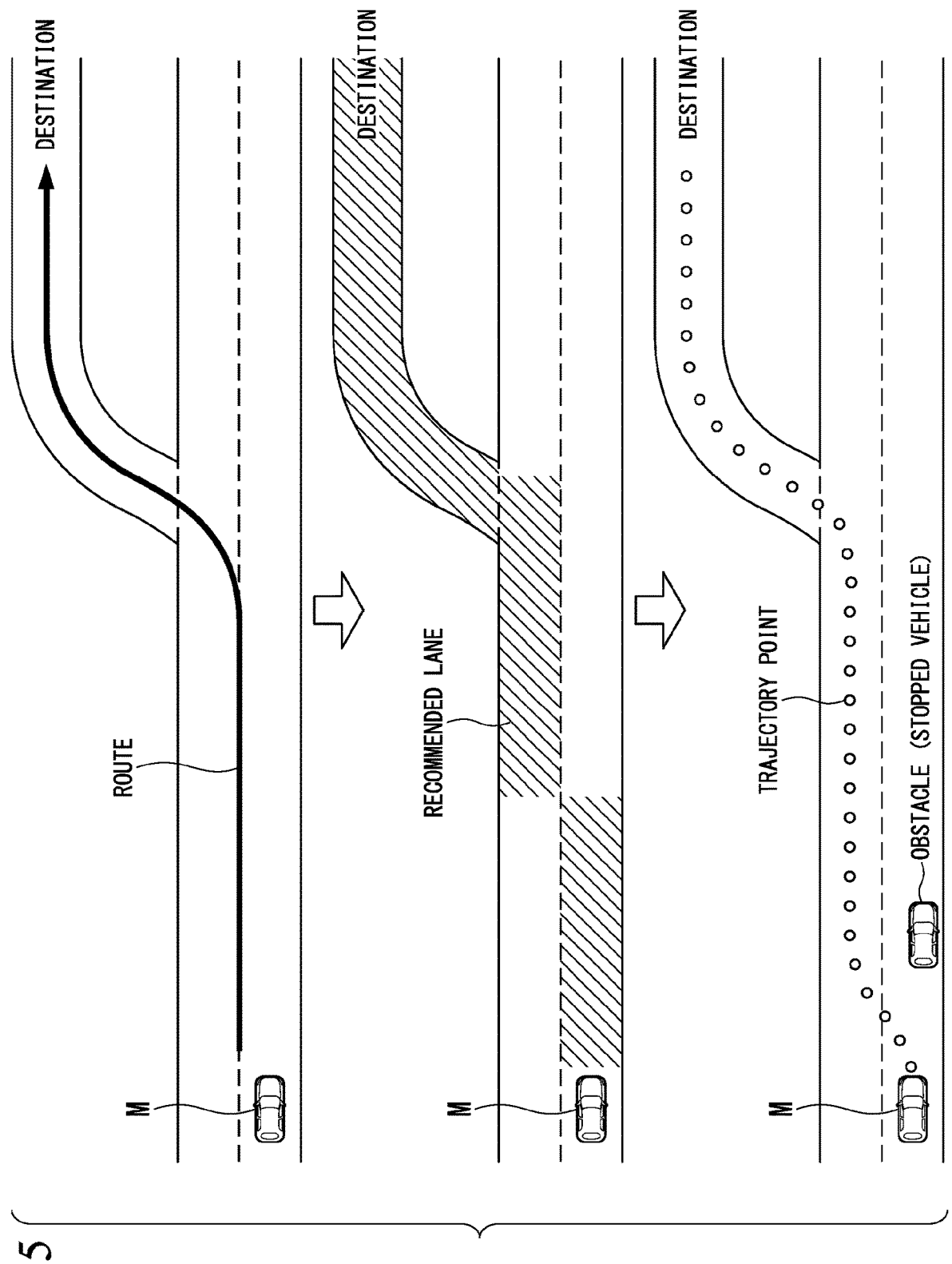
FIG. 5 is a diagram showing a process stage of autonomous driving.

FIG. 5 is a diagram showing a process stage of autonomous driving. First, as shown in the upper part, a route is decided on a navigation map by the navigation device 110. This route is, for example, a rough route in which lanes are not distinguished from each other. Next, as shown in the middle part, the recommended lane decision device 120 decides a recommended lane in which a vehicle has a tendency to travel along a route on a high-accuracy map. As shown in the lower part, the behavior plan generator 146 plans various events in a route in which a recommended lane is decided, and generates a target trajectory on the basis of the event.

In a case where the planned event is a lane keeping event, the behavior plan generator 146 generates a target trajectory having trajectory points disposed at the lane center so as to maintain a host lane. A target speed in this case may be the same as a reference speed such as, for example, a legal speed.

In addition, in a case where the planned event is a following traveling event, the behavior plan generator 146 decides, for example, a target speed so that an inter-vehicle distance between a preceding vehicle and the host vehicle M becomes constant, and generates a target trajectory having trajectory points disposed at the lane center so as to maintain a host lane. In a case where the speed of a preceding vehicle is low like, particularly, during a traffic jam, and frequent stops occur, the behavior plan generator 146 may reduce a target speed to zero in accordance with a stop of a preceding vehicle, and decide the target speed so as to be equal to the speed of the preceding vehicle in a case where it starts.

In addition, in a case where the planned event is a lane change event, the behavior plan generator 146 derives, for example, a plurality of curves (for example, spline curves) leading from a host lane to an adjacent lane, and in a case where the plurality of curves derived are set to a target trajectory, a curve in which lateral acceleration (acceleration in a vehicle width direction) occurring when the host vehicle M is caused to travel along the target trajectory is set to be equal to or less than a threshold is decided to be a target trajectory. A target speed in this case is decided on the basis of, for example, time headway or the like in an adjacent lane.

[Vehicle Control Performed by Traveling Controller]

The traveling controller 148 performs speed control (acceleration and deceleration control) and steering control of the host vehicle M so that host vehicle M passes through the target trajectory generated by the behavior plan generator 146 on scheduled time. For example, the speed control performed by the traveling controller 148 involves controlling some or all of the traveling driving force output device 130, the electric servo brake device 131, and the transmission control device 132 which are connected to the first bus BS1. In addition, the steering control performed by the traveling controller 148 involves controlling the electromotive power steering device 300 connected to the first bus BS1. The speed control and the steering control are an example of "traveling control."

For example, the traveling controller 148 decides the amounts of control of the traveling driving force output device 130, the electric servo brake device 131, and the transmission control device 132 in accordance with a target speed indicated by the target trajectory.

In addition, for example, the traveling controller 148 decides the amount of control of the electromotive power steering device 300 so that displacement equivalent to a target rudder angle indicated by the target trajectory is given to a wheel.

In addition, for example, the traveling controller 148 controls the first display device 133 or the illumination device 134 in association with the speed control or the steering control. For example, the traveling controller 148 causes the first display device 133 to display the speed, target trajectory, route, recommended lane, or the like of the host vehicle M, and turns on various lamps of the illumination device 134 in accordance with the speed control and the steering control.

In addition, when some or all of the traveling driving force output device 130, the electric servo brake device 131, the transmission control device 132, and the electromotive power steering device 300 are controlled, the traveling controller 148 stops control of each device to be controlled in a case where each device starts an operation of control intended to stabilize unstable behavior of a vehicle by itself, and restarts control in a case where an operation of each of these devices is terminated. For example, when the electric servo brake device 131 is controlled, the traveling controller 148 interrupts control of the electric servo brake device 131 in a case where the brake ECU of the electric servo brake device 131 starts to control an electric motor, and stands by until the operation of the electric servo brake device 131 is terminated. In a case where the operation of the electric servo brake device 131 is terminated, the traveling controller 148 restarts control of the electric servo brake device 131 on the basis of the target trajectory.

The switching controller 150 switches the driving mode of the host vehicle M on the basis of a behavior plan which is generated by the behavior plan generator 146. The driving mode includes, for example, an autonomous driving mode, a driving assistance mode, and a manual driving mode.

The autonomous driving mode is, for example, a driving mode in which the traveling driving force output device 130, the electric servo brake device 131, the transmission control device 132, the electromotive power steering device 300, and the like are controlled by the traveling controller 148 of the first control device 140.

The driving assistance mode is, for example, a driving mode in which a traveling assistance controller 246 of the second control device 240 to be described later controls a vehicle behavior stabilization device 210, an electric parking brake device 211, the electromotive power steering device 300 and the like, or a driving mode in which, assistance control for an occupant-led driving operation of the host vehicle M, any of the first control device 140, the camera ECU 102a, or a camera ECU 202a controls the traveling driving force output device 130, the electric servo brake device 131, the transmission control device 132, the electromotive power steering device 300 and the like.

The manual driving mode is, for example, a driving mode in which the traveling driving force output device 130, the electric servo brake device 131, the transmission control device 132, the electromotive power steering device 300 and the like are controlled by an occupant's operation of a driving operator such as a steering wheel, an accelerator pedal, a brake pedal, or a shift lever.

For example, the switching controller 150 switches the driving mode from the manual driving mode or the driving assistance mode to the autonomous driving mode at a point scheduled to start autonomous driving. In addition, the switching controller 150 switches the driving mode from the autonomous driving mode to the manual driving mode or the driving assistance mode at a point scheduled to terminate autonomous driving (for example, a destination).

In addition, the switching controller 150 may switch, for example, the driving mode executed in accordance with an operation of a switch or the like included in the HMI 114 to another driving mode.

In addition, the switching controller 150 may switch the driving mode from the autonomous driving mode to the manual driving mode on the basis of a detection signal which is input from the driving operator. For example, in a case where the amount of operation indicated by the detection signal exceeds a threshold, that is, a case where the driving operator receives an operation from an occupant with the amount of operation exceeding the threshold, the switching controller 150 switches the driving mode from the autonomous driving mode from the manual driving mode. For example, in a case where the driving mode is set to the autonomous driving mode, and a steering wheel, an accelerator pedal or a brake pedal is operated with the amount of operation exceeding the threshold by an occupant, the switching controller 150 switches the driving mode from the autonomous driving mode from the manual driving mode.

During the manual driving mode, an input signal from the driving operator (a detection signal indicating how much the amount of operation is) is output to the traveling driving force output device 130, the electric servo brake device 131, the transmission control device 132, and the electromotive power steering device 300. In the following description, various motors, driving mechanisms associated therewith, and the like of the traveling driving force output device 130, the electric servo brake device 131, and the transmission control device 132 which are connected to the first bus BS1, the vehicle behavior stabilization device 210 and the electric parking brake device 211 which are connected to the second bus BS2 to be described later, and the electromotive power steering device 300 connected to both the first bus BS1 and the second bus BS2 are simply referred to as "actuators." One of the actuator on the autonomous driving control system 100 side and the actuator on the driving assistance control system 200 side is an example of a "first actuator," and the other is an example of a "second actuator."

The first determiner 152 determines whether the operating states of various sensors and actuators on the autonomous driving control system 100 side satisfy a predetermined condition. The predetermined condition refers to, for example, a decrease in current performance of sensors or actuators due to various factors as compared to original performance. The "decrease in current performance of sensors or actuators due to various factors as compared to original performance" includes, for example, sensors and actuators themselves not being in an original state due to degradation over time or the like, information to be originally obtained from various sensors not being obtained due to a communication failure, an operation which is not indicated by an actuator that is a control target being performed, or the like.

In addition, the first determiner 152 determines, for example, whether the operating states of various sensors and actuators on the driving assistance control system 200 side satisfy a predetermined condition on the basis of information received from the second control device 240 through a second communication line L2. The second communication line L2 is, for example, a CAN communication line or the like.

For example, in a case where it is determined by the first determiner 152 that the operating states of any of various sensors and actuators on the autonomous driving control system 100 side satisfy the predetermined condition, the traveling controller 148 stops control of the traveling driving force output device 130, the electric servo brake device 131, the transmission control device 132, and the electromotive power steering device 300 and outputs an alternative control command signal to the second control device 240 through the second communication line L2 that connects the first control device 140 and the second bus BS2 on the driving assistance control system 200 side. The alternative control command signal is, for example, a signal for delivering a control right of the host vehicle M from one system side to the other system side, and causing a system that has received the control right to perform control in lieu of vehicle control to be performed in a system that has transferred the control right (hereinafter referred to as alternative control). The alternative control command signal is an example of a "predetermined signal."

In addition, for example, in a case where it is determined by the first determiner 152 that the operating states of any of various sensors and actuators on the driving assistance control system 200 side satisfy the predetermined condition, that is, a case where the alternative control command signal is received from the driving assistance control system 200 through the second communication line L2, the traveling controller 148 performs, as the alternative control, the speed control or the steering control using a sensor or an actuator on the host system side of a type that is the same as or similar to a sensor or an actuator satisfying the predetermined condition among sensors or actuators on the driving assistance control system 200 side.

[Vehicle Control Performed by ECU of First Camera]

The camera ECU 102a of the first camera 102 controls various devices connected to the first bus BS1 separately from the speed control and the steering control which are performed by the above-described first control device 140.

For example, in a case where a nearby vehicle present in front of the host vehicle M (hereinafter referred to as a preceding vehicle) is detected from an image captured by the first camera 102, and a time to collision TTC obtained by dividing an inter-vehicle distance between the preceding vehicle and the host vehicle M by a relative speed between the preceding vehicle and the host vehicle M is set to be equal to or less than a first predetermined time, the camera ECU 102a controls the first display device 133 connected to the first bus BS1, and informs an occupant of the host vehicle M that the preceding vehicle has come relatively close.

In addition, for example, in a case where the time to collision TTC with the preceding vehicle is set to be equal to or less than a second predetermined time shorter than the first predetermined time, the camera ECU 102a decelerates the host vehicle M by controlling some or all of the traveling driving force output device 130, the electric servo brake device 131, and the transmission control device 132 which are connected to the first bus BS1.

In addition, for example, in a case where the preceding vehicle which is stopped or driven slowly starts at a constant speed or more, or is located at a certain distance or more, the camera ECU 102a controls the first display device 133 connected to the first bus BS1, and informs an occupant of the host vehicle M that the preceding vehicle has started.

In addition, the camera ECU 102a detects, for example, a mark installed on a roadside or a road sign drawn on a road surface from an image captured by the first camera 102, and displays the mark or the road sign on the first display device 133 connected to the first bus BS1.

In addition, the camera ECU 102a detects the presence or absence of turning-on of various lamps such as the headlamp or tail lamp of a nearby vehicle from an image captured by the first camera 102. For example, in a case where it is recognized that the headlamp of an opposing vehicle and the tail lamp of a preceding vehicle are not turned on, the camera ECU 102a controls the illumination device 134 connected to the first bus BS1 through the first display device 133, and switches the headlamp of the host vehicle M to a high beam.

[Configuration on Driving Assistance Control System Side]

Hereinafter, the configuration of the driving assistance control system 200 will be described. The driving assistance control system 200 includes, for example, the second camera 202, the radar 204, a second vehicle sensor 206, the vehicle behavior stabilization device 210, the electric parking brake device 211, the second display device 212, the second steering ECU 300b for driving the electric motor of the electromotive power steering device 300, and the second control device 240. The second camera 202 and the radar 204 are another example of a "first acquirer" or a "second acquirer."

The vehicle behavior stabilization device 210, the electric parking brake device 211, the second display device 212, the second steering ECU 300b, and the second control device 240 are connected to one another through the common second bus BS2, and other sensors or devices are connected to one another through another communication line. The second bus BS2 or another communication line is a multiplex communication line or a serial communication line such as a CAN communication line.

The second camera 202 is a digital camera using a solid-state imaging element such as, for example, a CCD or a CMOS. The second camera 202 is installed at any points on the host vehicle M. In a case where a forward image is captured, the second camera 202 is installed on the upper portion of the front windshield, the rear surface of the rear-view mirror, or the like. The second camera 202, for example, repeatedly captures an image of the vicinity of the host vehicle M periodically. The second camera 202 may be a stereo camera. The second camera 202 is an example of a "detector."

In addition, the second camera 202 includes, for example, the camera ECU 202a. The camera ECU 202a includes one or more microcontrollers. The camera ECU 202a controls various devices connected to the second bus BS2 separately from control performed by the second control device 240. The specific content of control will be described later.

The radar 204 radiates radio waves such as millimeter waves to the vicinity of the host vehicle M, and detects radio waves (reflected waves) reflected from an object to detect at least the position (distance to and orientation of) of the object. The radar 204 is installed on, for example, a vehicle front end side such as a front grill, a front bumper, or the inside of a headlight, a vehicle rear end side such as a trunk lid, or a vehicle lateral end side such as the vicinity of a side mirror or a side light. The radar 204 may detect the position and speed of an object with a frequency modulated continuous wave (FM-CW) system. The radar 204 is another example of the "detector."

In addition, the radar 204 includes, for example, a radar ECU 204a. The radar ECU 204a includes one or more microcontrollers. The radar ECU 204a controls various devices connected to the second bus BS2 separately from the control performed by the second control device 240. The specific content of control will be described later.

The second vehicle sensor 206 includes, for example, a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like. The second vehicle sensor 206 outputs information indicating a detection result to the second control device 240.

The vehicle behavior stabilization device 210 has, for example, a function of suppressing the occurrence of slipping due to wheel locking during a sudden brake or when a brake is applied on a low-friction road, a function of suppressing wheel idling during start or stop, and a function of suppressing the occurrence of skidding by controlling the posture of the host vehicle M during turning. For example, the vehicle behavior stabilization device 210 includes a dedicated ECU (hereinafter referred to as a behavior stabilization ECU). A combination of the vehicle behavior stabilization device 210 and the radar ECU 204a is an example of a "behavior suppressor."

For example, the behavior stabilization ECU controls an electric motor that drives a pump as the slipping suppression function, and scoops a brake fluid (an oil fluid) from a cylinder that transfers hydraulic pressure to the brake caliper of a locked wheel using a pump, to thereby lower the hydraulic pressure and release locking. The brake caliper, the cylinder and the like are shared with the electric servo brake device 131.

In addition, for example, in a case where a detection value detected by a sensor (not shown) that detects the rotational speed or rotational frequency of a driving wheel is set to be equal to or greater than a threshold, the behavior stabilization ECU reduces a driving force by controlling one or both of an internal-combustion engine and an electric motor in order to lower the rotational speed or rotational frequency of the driving wheel as the idling suppression function. The internal-combustion engine and the electric motor are shared with the traveling driving force output device 130. In addition, the behavior stabilization ECU may control the electric motor so as to transfer hydraulic pressure to the brake caliper of a brake pad corresponding to a driving wheel (an idling driving wheel) of which the rotational speed or rotational frequency is set to be equal to or greater than the threshold, and suppress idling of the driving wheel by applying a brake.

In addition, for example, the behavior stabilization ECU reduces a driving force by controlling one or both of the internal-combustion engine or the electric motor during turning at a certain rudder angle or more as the skidding suppression function, and decelerates the host vehicle M by controlling the electric motor so as to transfer hydraulic pressure to the brake caliper of a brake pad corresponding to the driving wheel or another wheel.

The electric parking brake device 211 includes, for example, a dedicated ECU (hereinafter referred to as a parking brake ECU). The parking brake ECU controls, for example, the electric motor so as to transfer hydraulic pressure to the brake caliper of a brake pad corresponding to a rear wheel, and stops the host vehicle M by giving a braking force to a wheel.

The second display device 212 is various types of display device such as, for example, a liquid crystal display (LCD) or an organic electroluminescence (EL) display. The second display device 212 is installed at, for example, a dashboard on the front of a driver's seat, and functions as a meter panel for displaying a speedometer, an odometer, a tachometer, a fuel gauge, a direction indicator light, or the like.

The second steering ECU 300b drives the electric motor included in the electromotive power steering device 300. The second steering ECU 300b controls an inverter connected to the other stator (a stator that is not a control target of the first steering ECU 300a) out of two stators of the electric motor to thereby rotate a rotor and drive the electric motor.

[Configuration of Second Control Device]

Hereinafter, the configuration of the second control device 240 will be described. The second control device 240 includes one or more processors such as a CPU or an MPU and various storage devices such as an HDD, a flash memory, a RAM, or a ROM, and executes various processes. In addition, the second control device 240 is connected to the first control device 140 through the above-described first communication line L1.

Figure 6:
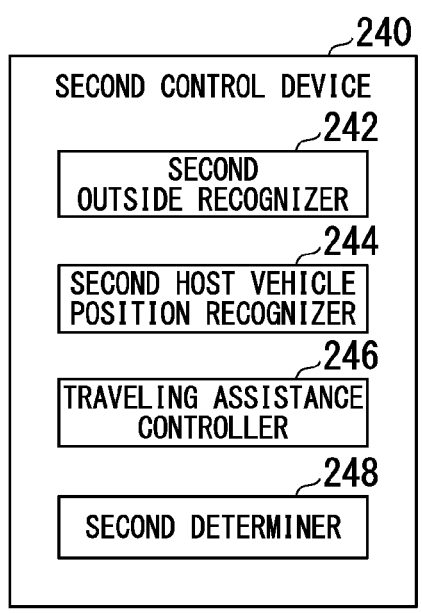
FIG. 6 is a configuration diagram of a second control device 240.

FIG. 6 is a configuration diagram of the second control device 240. The second control device 240 includes, for example, a second outside recognizer 242, a second host vehicle position recognizer 244, the traveling assistance controller 246, and a second determiner 248. Some or all of these components are realized by, for example, a processor executing programs (software) stored in a storage device. In addition, some or all of these components may be realized by hardware such as an LSI, an ASIC, or an FPGA, or may be realized by software and hardware in cooperation.

The second outside recognizer 242 recognizes, for example, states of the position, speed, acceleration and the like of an object such as a nearby vehicle on the basis of detection results of the second camera 202 and the radar 204.

In addition, the second outside recognizer 242 may acquire detection results of the first camera 102 and the viewfinder 104 on the autonomous driving control system 100 side through the first communication line L1, and recognize states of the position, speed, acceleration and the like of an object such as a nearby vehicle.

The second host vehicle position recognizer 244 recognizes, for example, a traveling lane in which the host vehicle M is currently traveling, and the relative position and posture of the host vehicle M with respect to the traveling lane. For example, the second host vehicle position recognizer 244 recognizes a traveling lane from a road division line in the vicinity of the host vehicle M which is recognized from an image captured by the second camera 202, and further recognizes the position and posture of the host vehicle M with respect to the recognized traveling lane.

[Vehicle Control Performed by Traveling Assistance Controller]

The traveling assistance controller 246 performs speed assistance control (deceleration control) and steering assistance control of the host vehicle M on the basis of the relative distance, relative speed, time to collision TTC, or the like between the host vehicle M and an object recognized by the second outside recognizer 242. For example, the speed assistance control performed by the traveling assistance controller 246 involves controlling one or both of the vehicle behavior stabilization device 210 and the electric parking brake device 211 which are connected to the second bus BS2. In addition, the steering assistance control performed by the traveling assistance controller 246 involves controlling the electromotive power steering device 300 connected to the second bus BS2.

In addition, the traveling assistance controller 246 may perform the speed assistance control and the steering assistance control on the basis of the position and posture of the host vehicle M with respect to a traveling lane recognized by the second host vehicle position recognizer 244. The speed assistance control and the steering assistance control are another example of "traveling control."

In addition, when some or all of the vehicle behavior stabilization device 210, the electric parking brake device 211, and the electromotive power steering device 300 are controlled, the traveling assistance controller 246 stops control of each device to be controlled in a case where each device starts an operation of control intended to stabilize unstable behavior of a vehicle by itself, and restarts control in a case where an operation of each of these devices is terminated. For example, when the vehicle behavior stabilization device 210 is controlled, the traveling assistance controller 246 interrupts control of the vehicle behavior stabilization device 210 in a case where the behavior stabilization ECU of the vehicle behavior stabilization device 210 starts to control an electric motor, an internal-combustion engine, an electromotor or the like, and stands by until the operation of the vehicle behavior stabilization device 210 is terminated. In a case where the operation of the vehicle behavior stabilization device 210 is terminated, the traveling assistance controller 246 restarts control of the vehicle behavior stabilization device 210 on the basis of the relative distance, relative speed, time to collision TTC, or the like between an object and the host vehicle M.

The second determiner 248 determines whether the operating states of various sensors and actuators on the driving assistance control system 200 side satisfy a predetermined condition.

In addition, the second determiner 248 determines, for example, whether the operating states of various sensors and actuators on the autonomous driving control system 100 side satisfy the predetermined condition on the basis of information received from the first control device 140 through the first communication line L1.

For example, in a case where it is determined by the second determiner 248 that the operating states of any of various sensors and actuators on the driving assistance control system 200 side satisfy the predetermined condition, the traveling assistance controller 246 stops control of the vehicle behavior stabilization device 210, the electric parking brake device 211, and the electromotive power steering device 300, and outputs an alternative control command signal to the first control device 140 through the second communication line L2.

In addition, for example, in a case where it is determined by the second determiner 248 that the operating states of any of various sensors and actuators on the autonomous driving control system 100 side satisfy the predetermined condition, that is, a case where the alternative control command signal is received from the autonomous driving control system 100 through the second communication line L2, the traveling assistance controller 246 performs, as the alternative control, the speed assistance control or the steering assistance control using a sensor or an actuator on the host system side of a type that is the same as or similar to a sensor or an actuator satisfying the predetermined condition among sensors or actuators on the autonomous driving control system 100 side.

[Vehicle Control Performed by ECU of Second Camera]

The camera ECU 202a of the second camera 202 controls various devices connected to the second bus BS2 separately from the speed assistance control and the steering assistance control which are performed by the above-described traveling assistance controller 246.

For example, in a case where the division line of a host lane in which the host vehicle M travels is detected from an image captured by the second camera 202, and the host vehicle M seems to deviate from the host lane, the camera ECU 202a urges an occupant in a driver's seat to take precautions by causing the second display device 212 connected to the second bus BS2 to display a predetermined image and vibrating a steering wheel. In addition, in a case where the steering wheel is vibrated, and then there is no operation of the steering wheel from the occupant, the camera ECU 202a changes the direction of a turning wheel to the lane center by controlling the electric motor of the electromotive power steering device 300, and assists the host vehicle M to return to the host lane. In addition, for example, in a case where the great deviation of the host vehicle M from the host lane center is detected from an image captured by the second camera 202, the camera ECU 202a mediates the amount of control of an electric motor calculated by another functional unit of the radar ECU 204a, the second control device 240 or the like, and calculates the amount of control of the electric motor as much as taken up by control of its own (the camera ECU 202a). The camera ECU 202a controls the electric motor with the amount of control calculated in consideration of a balance with another functional unit, and decelerates the host vehicle M by transferring hydraulic pressure to the brake caliper of a brake pad corresponding to a driving wheel and giving a braking force to a wheel. In addition, the camera ECU 202a may calculate the amount of control of the electric motor in order to suppress lane deviation, and transmit information indicating the calculated amount of control to the second control device 240. Receiving this, the second control device 240 mediates the amount of control that it calculates and the amount of control calculated by the camera ECU 202a, and calculates the amount of control of the electric motor again. The second control device 240 controls the electric motor with the calculated amount of control, and transfers hydraulic pressure to the brake caliper of a brake pad corresponding to a driving wheel to give a braking force to a wheel. In addition, mediation when the electric motor is controlled may be performed by the first control device 140 instead of being performed by the camera ECU 202a or the second control device 240. Lane deviation is suppressed by such control.

[Vehicle Control Performed by ECU of Radar]

The radar ECU 204a of the radar 204 controls various devices connected to the second bus BS2 separately from the speed assistance control and the steering assistance control which are performed by the above-described traveling assistance controller 246.

For example, in a case where a nearby vehicle is detected at the oblique rear of the host vehicle M which is a blind spot when seen by an occupant in a driver's seat, the radar ECU 204a controls the illumination device 134 connected to the second bus BS2 through the second display device 212, to thereby turn on or blink an LED lamp installed on a side mirror. Thereby, the occupant in the driver's seat is informed that a nearby vehicle is present at the oblique rear of the host vehicle M.

In addition, in a case where, for example, when the host vehicle M performs a lane change from the host lane to an adjacent lane, a nearby vehicle is detected at the rear of the host vehicle M in the adjacent lane that is a lane change destination, and the nearby vehicle suddenly approaches the host vehicle M, the radar ECU 204a controls the illumination device 134, to thereby turn on or blink an LED lamp installed in a side mirror. Thereby, the occupant is urged to take precautions.

In addition, in a case where, for example, when the host vehicle M is traveling backward, a nearby vehicle approaching from the side of the host vehicle M is detected, the radar ECU 204a controls the illumination device 134, to thereby turn on or blink an LED lamp installed on a side mirror. Thereby, the occupant is urged to take precautions. Meanwhile, in various types of control described above, the radar ECU 204a may output predetermined information, using an image or the like, to the second display device 212 or the first display device 133 instead of or in addition to turning on or blinking an LED lamp installed on a side mirror.

[Process Flow]

Figure 7:
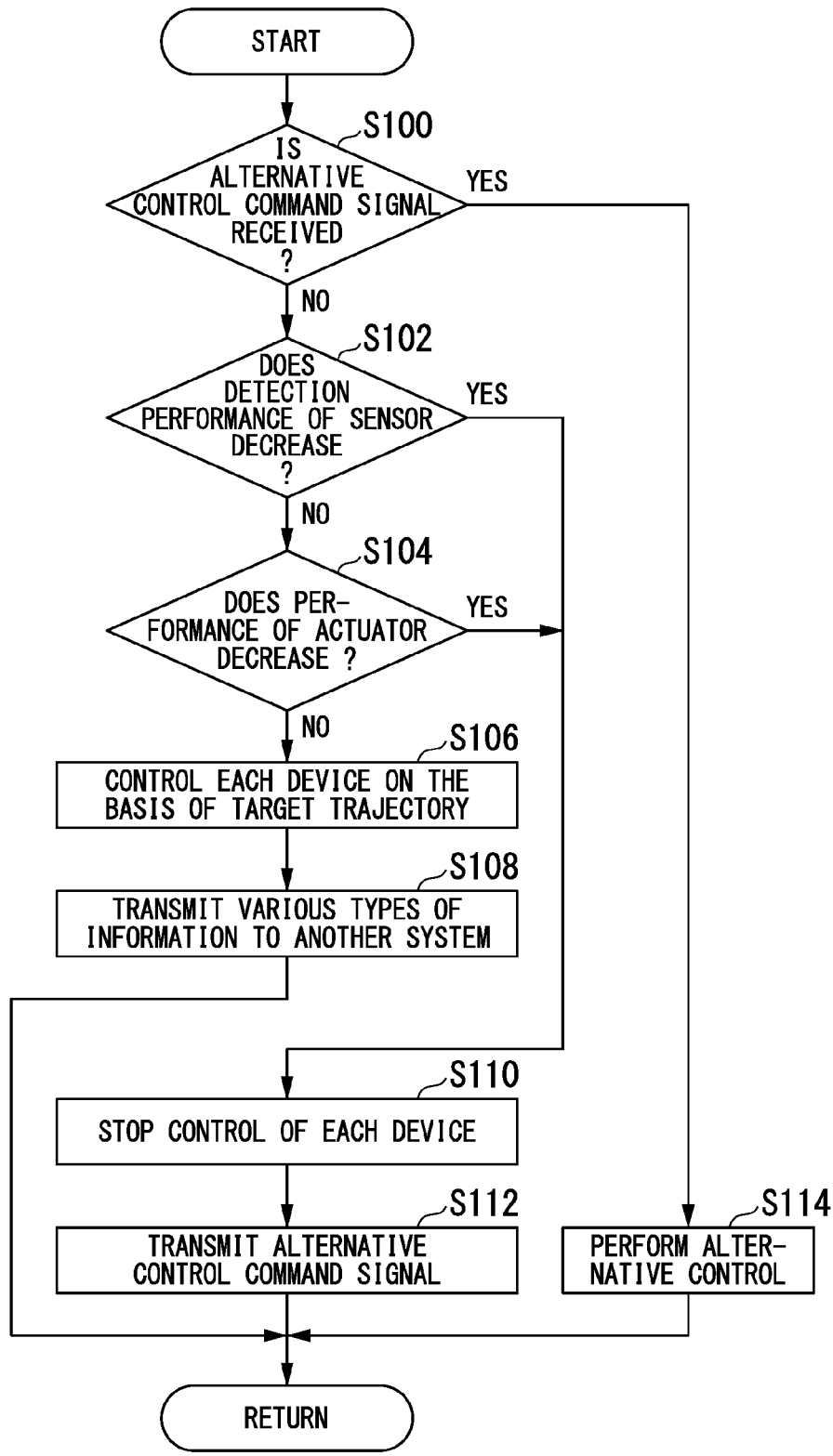
FIG. 7 is a flow chart showing an example of a series of processes performed by the first control device 140 or the second control device 240.

Hereinafter, a flow of processes performed by each control device until the alternative control command signal is output will be described with reference to a flow chart. FIG. 7 is a flow chart showing an example of a series of processes performed by the first control device 140 or the second control device 240. In the following description, as an example, the process of the present flow chart is executed by the first control device 140.

First, the first determiner 152 determines whether the alternative control designation signal has received from the driving assistance control system 200 side (step S100).

In a case where it is determined that the alternative control designation signal has not been received, the first determiner 152 determines whether the detection performance of any sensor on the autonomous driving control system 100 side has decreased (step S102). In a case where it is determined by the first determiner 152 that the detection performance of any sensor has decreased, the traveling controller 148 transitions a process of S110 to be described later.

On the other hand, in a case where it is determined that the detection performance of any sensor has not decreased, the first determiner 152 further determines whether the performance of any actuator on the autonomous driving control system 100 side has decreased (step S104).

In a case where it is determined by the first determiner 152 that the performance of any actuator has not decreased, the behavior plan generator 146 generates a target trajectory, and the traveling controller 148 controls the traveling driving force output device 130, the electric servo brake device 131, the transmission control device 132, and the electromotive power steering device 300 on the basis of the target trajectory (step S106).

Next, the traveling controller 148 transmits some or all of information which is output by the object recognition device 106, map information (high-accuracy map information) including a route in which a recommended lane is decided by the recommended lane decision device 120, information indicating the detection result of the first vehicle sensor 108, and a detection signal detected by the operation detector that is a driving operator to the second control device 240 through the first communication line L1 (step S108). Thereby, the second control device 240 can share various types of information used in the first control device 140.

On the other hand, in a case where it is determined by the first determiner 152 that the performance of any actuator has decreased, the traveling controller 148 stops control of the traveling driving force output device 130, the electric servo brake device 131, the transmission control device 132, and the electromotive power steering device 300 (step S110). Meanwhile, while the traveling controller 148 stops control of these devices, the camera ECU 102a of the first camera 102 may control these devices.

The traveling controller 148 transmits the alternative control designation signal to the second control device 240 of the driving assistance control system 200 through the second communication line L2 or the first communication line L1 (step S112).

In addition, in a case where it is determined by the first determiner 152 that the alternative control designation signal has been received from the driving assistance control system 200 side in the above-described process of S100, the traveling controller 148 performs the alternative control (step S114). Thereby, the process of the present flow chart is terminated.

Figure 8:
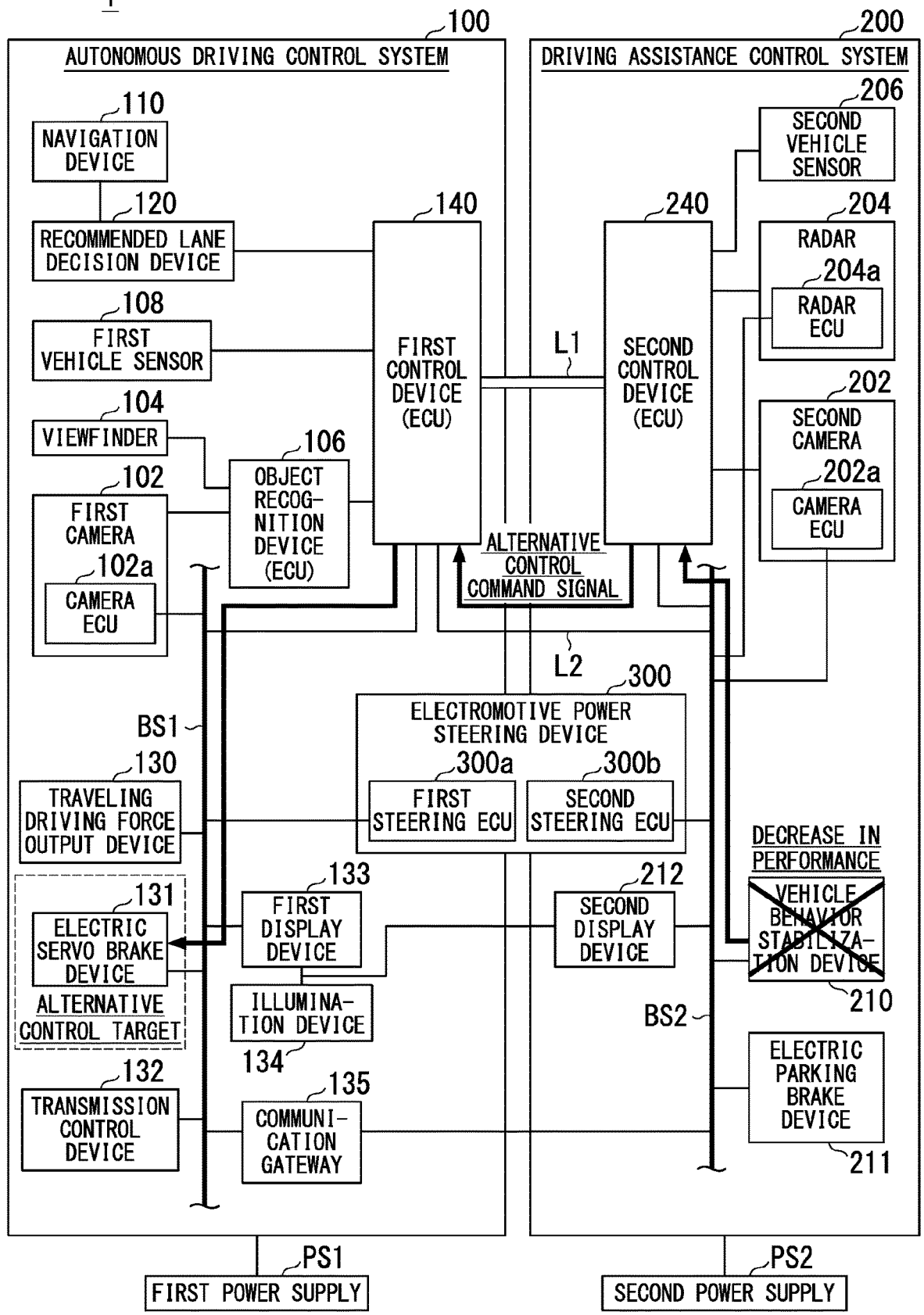
FIG. 8 is a diagram schematically showing an example of a status in which alternative control is performed.

FIG. 8 is a diagram schematically showing an example of a status in which the alternative control is performed. As in the shown example, in a case where the performance of the vehicle behavior stabilization device 210 on the driving assistance control system 200 side has decreased, the second determiner 248 of the second control device 240 determines that the operating state of the actuator of the vehicle behavior stabilization device 210 satisfies a predetermined condition. In this case, the traveling assistance controller 246 transmits the alternative control command signal to the first control device 140 through the second communication line L2. This alternative control command signal contains, for example, information relating to a sensor or an actuator (such as, for example, identification information of a sensor or identification information of an actuator) in which it is determined that the operating state satisfies the predetermined condition, among sensors or actuators on the driving assistance control system 200 side. In a case where such an alternative control command signal has been received, the traveling controller 148 performs speed control or steering control using a device including a sensor or an actuator corresponding to the sensor or the actuator satisfying the predetermined condition on the driving assistance control system 200 side. In the shown example, since the performance of the vehicle behavior stabilization device 210 decreases, the traveling controller 148 performs speed control (deceleration control) using the electric servo brake device 131 having a function of deceleration control instead of a skidding suppression function.

At this time, in a case where the electric servo brake device 131 is controlled separately by the camera ECU 102*a*, the traveling controller 148 mediates control according to the alternative control command signal. For example, in a case where the alternative control command signal has been received when the electric servo brake device 131 is controlled by the camera ECU 102*a*, the traveling controller 148 prioritizes control performed by the camera ECU 102*a*, and controls the electric servo brake device 131 as alternative control according to the alternative control command signal at a point in time when this control is terminated.

On the other hand, in a case where the performance of the actuator (i.e. first actuator) of the electric servo brake device 131 on the autonomous driving control system 100 side has decreased, the first determiner 152 of the first control device 140 determines that the operating state of the actuator of the electric servo brake device 131 satisfies the predetermined condition. In this case, the traveling controller 148 (i.e. first controller) transmits the alternative control command signal (i.e. predetermined signal) to the second control device 240 (i.e. second controller) through the second communication line L2 or the first communication line L1. Receiving this, the traveling assistance controller 246 (i.e. second controller) performs the speed control (deceleration control) using the vehicle behavior stabilization device 210 (i.e. second actuator) having a function that is the same as or similar to a deceleration function of the electric servo brake device 131 (i.e. first actuator).

At this time, in a case where the vehicle behavior stabilization device 210 (i.e. second actuator) is controlled separately by the camera ECU 202*a* or the radar ECU 204*a* (i.e. electronic control unit), the traveling assistance controller 246 (i.e. second controller) mediates control according to the alternative control command signal (i.e. predetermined signal). For example, in a case where the alternative control command signal has been received when the vehicle behavior stabilization device 210 (i.e. second actuator) is controlled by the radar ECU 204*a* (i.e. electronic control unit), the traveling assistance controller 246 (i.e. second controller) prioritizes control performed by the radar ECU 204*a* (i.e. electronic control unit), and controls the vehicle behavior stabilization device 210 (i.e. second actuator) as alternative control according to the alternative control command signal (i.e. predetermined signal) at a point in time when this control is terminated.

Figure 9:
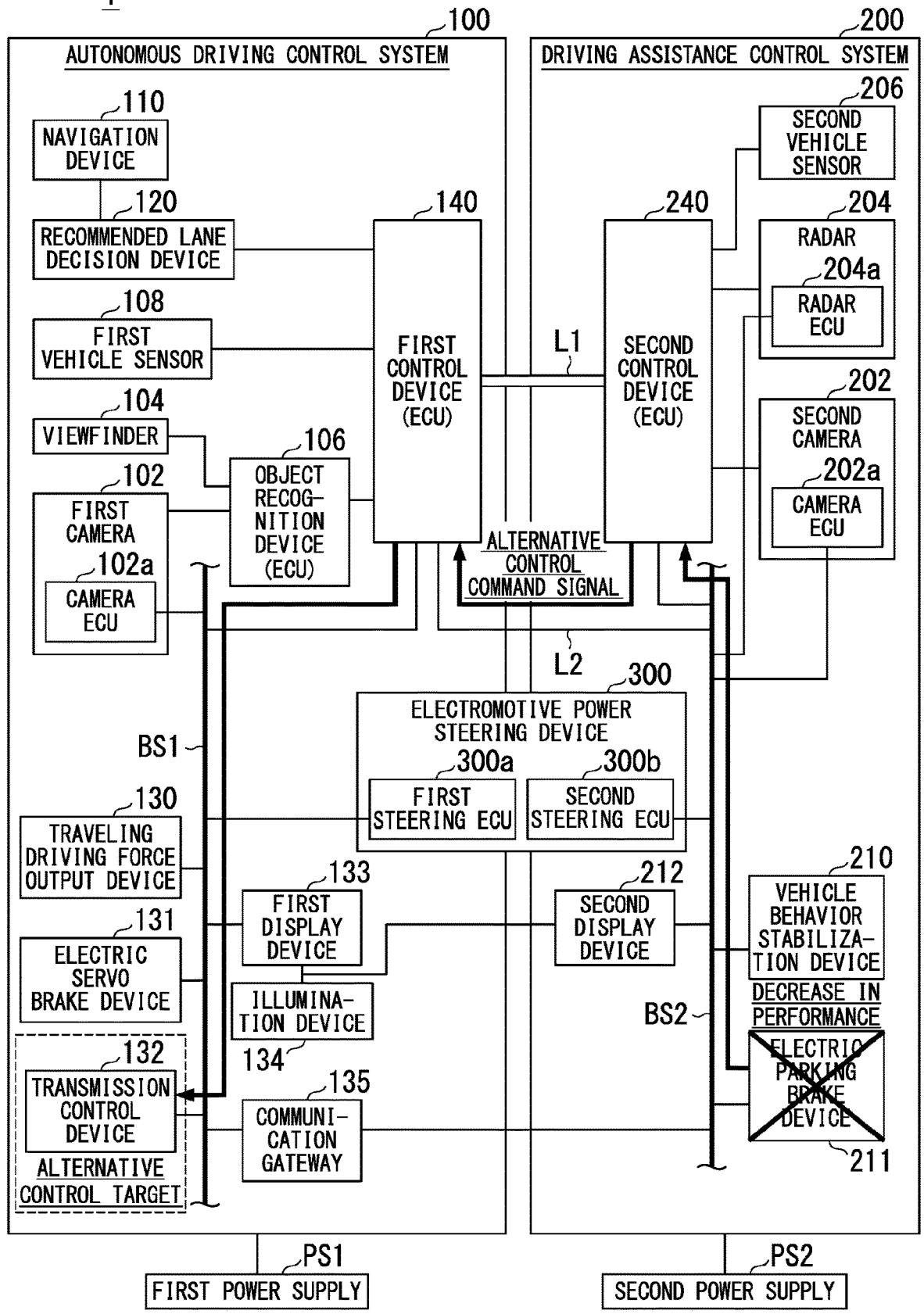
FIG. 9 is a diagram schematically showing another example of a status in which the alternative control is performed.

FIG. 9 is a diagram schematically showing another example of a status in which the alternative control is performed. As in the shown example, in a case where the performance of the electric parking brake device 211 on the driving assistance control system 200 side has decreased, the second determiner 248 of the second control device 240 determines that the operating state of the actuator of the electric parking brake device 211 satisfies the predetermined condition. In this case, the traveling assistance controller 246 transmits the alternative control command signal to the first control device 140 through the second communication line L2 or the first communication line L1. Receiving this, the traveling controller 148 stops the host vehicle M using the transmission control device 132 having a function that is the same as or similar to a function of continuing to stop the host vehicle M of the electric parking brake device 211 (a function of changing a shift range to a parking range).

At this time, in a case where the transmission control device 132 is controlled separately by the camera ECU 102*a*, the traveling controller 148 mediates control according to the alternative control command signal. For example, in a case where the alternative control command signal has been received when the transmission control device 132 is controlled by the camera ECU 102*a*, the traveling controller 148 prioritizes control performed by the camera ECU 102*a*, and controls the transmission control device 132 as alternative control according to the alternative control command signal at a point in time when this control is terminated.

On the other hand, in a case where the performance of the actuator of the transmission control device 132 on the autonomous driving control system 100 side has decreased, the first determiner 152 of the first control device 140 determined that the operating state of the actuator of the transmission control device 132 satisfies the predetermined condition. In this case, the traveling controller 148 transmits the alternative control command signal to the second control device 240 through the second communication line L2 or the first communication line L1. Receiving this, the traveling assistance controller 246 stops the host vehicle M using the electric parking brake device 211 having a function that is the same as or similar to a function of the transmission control device 132.

At this time, in a case where the electric parking brake device 211 is controlled separately by the camera ECU 202*a* or the radar ECU 204*a*, the traveling assistance controller 246 mediates control according to the alternative control command signal. For example, in a case where the alternative control command signal has been received when the electric parking brake device 211 is controlled by the radar ECU 204*a*, the traveling assistance controller 246 prioritizes control performed by the radar ECU 204*a*, and controls the electric parking brake device 211 as alternative control according to the alternative control command signal at a point in time when this control is terminated.

Figure 10:
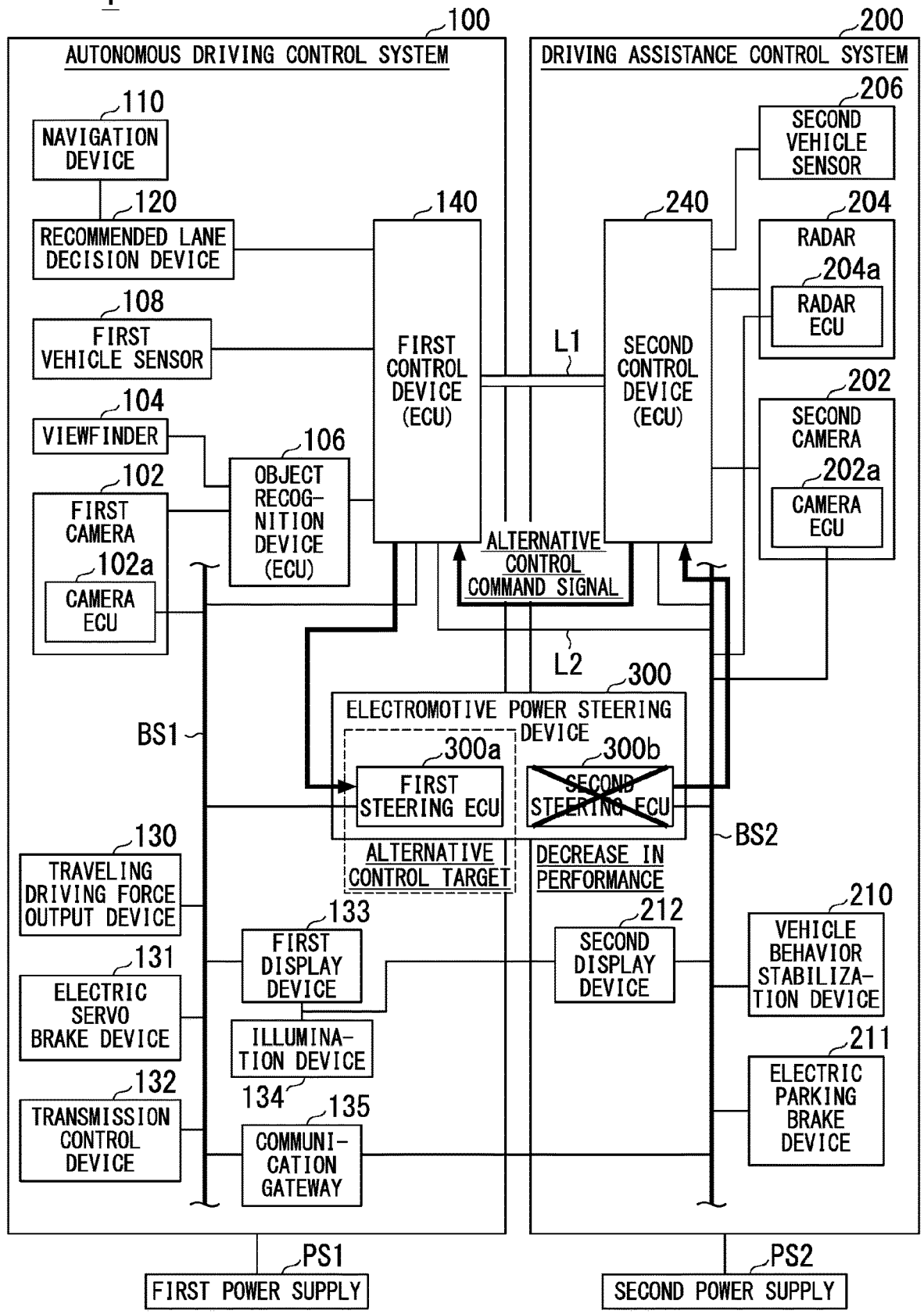
FIG. 10 is a diagram schematically showing another example of a status in which the alternative control is performed.

FIG. 10 is a diagram schematically showing another example of a status in which the alternative control is performed. As in the shown example, in a case where the performance of the second steering ECU 300*b* of the electromotive power steering device 300 has decreased, the second determiner 248 of the second control device 240 determines that the operating state of an inverter to be controlled by the second steering ECU 300*b* or a stator that receives supply of power from the inverter satisfies the predetermined condition. In this case, the traveling assistance controller 246 transmits the alternative control command signal to the first control device 140 through the second communication line L2 or the first communication line L1. Receiving this, the traveling controller 148 performs the steering control using the first steering ECU 300*a* having a function that is the same as or similar to that of the second steering ECU 300*b*.

At this time, in a case where the first steering ECU 300*a* is controlled separately the camera ECU 102*a*, the traveling controller 148 mediates control according to the alternative control command signal. For example, in a case where the alternative control command signal has been received when the first steering ECU 300*a* is controlled by the camera ECU 102*a*, the traveling controller 148 prioritizes control performed by the camera ECU 102*a*, and controls the first steering ECU 300*a* as alternative control according to the alternative control command signal at a point in time when this control is terminated.

On the other hand, in a case where the performance of the first steering ECU 300*a* on the autonomous driving control system 100 side has decreased, the first determiner 152 of the first control device 140 determines that the operating state of an inverter to be controlled by the first steering ECU 300a or a stator that receives supply of power from the inverter satisfies the predetermined condition. In this case, the traveling controller 148 transmits the alternative control command signal to the second control device 240 through the second communication line L2 or the first communication line L1. Receiving this, the traveling assistance controller 246 performs the steering control using the second steering ECU 300b having a function that is the same as or similar to that of the first steering ECU 300a.

At this time, in a case where the second steering ECU 300b is controlled separately by the camera ECU 202a or the radar ECU 204a, the traveling assistance controller 246 mediates control according to the alternative control command signal. For example, in a case where the alternative control command signal has been received when the second steering ECU 300b is controlled by the radar ECU 204a, the traveling assistance controller 246 prioritizes control performed by the radar ECU 204a, and controls the second steering ECU 300b as alternative control according to the alternative control command signal at a point in time when this control is terminated.

Figure 11:
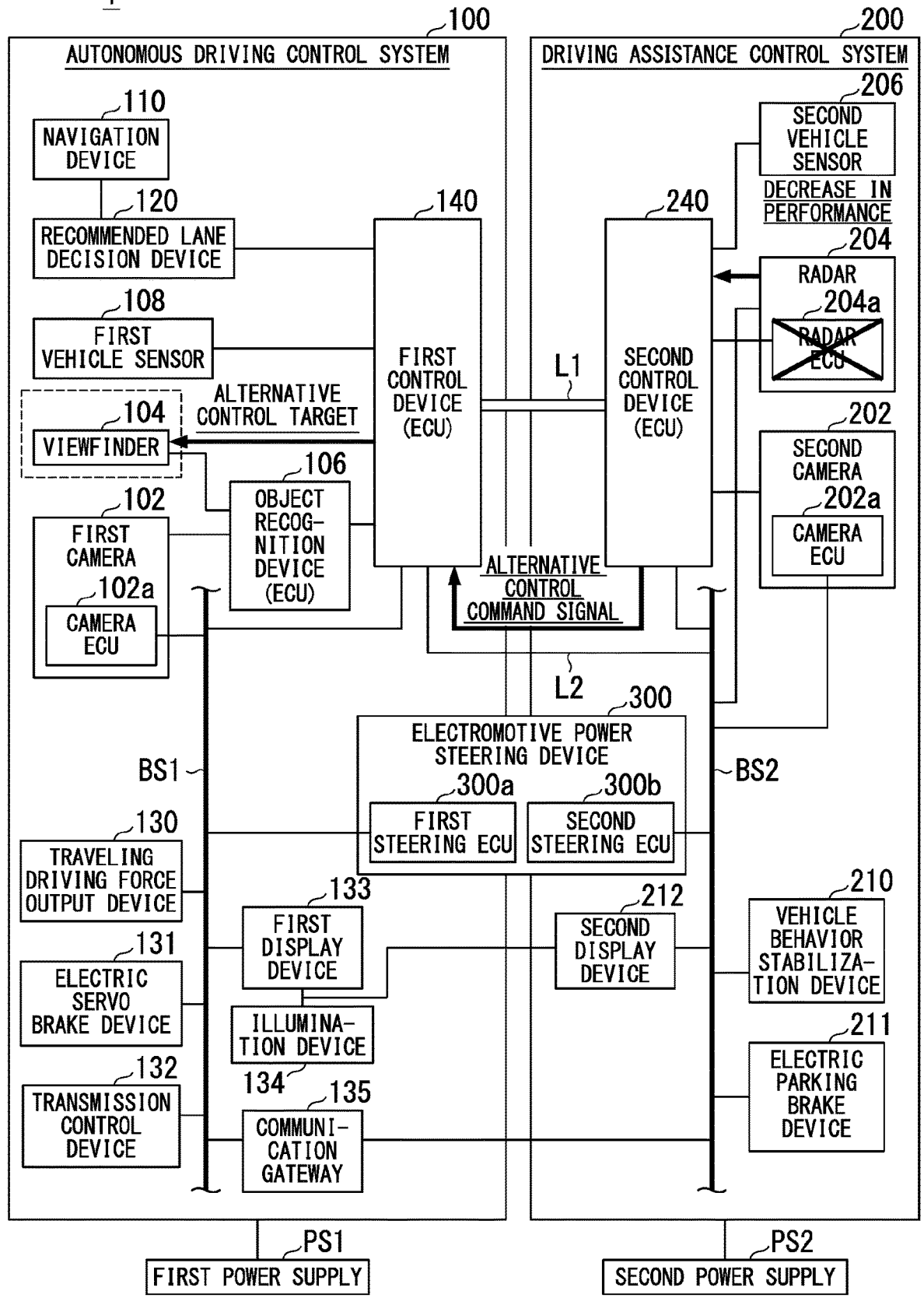
FIG. 11 is a diagram schematically showing another example of a status in which the alternative control is performed.

FIG. 11 is a diagram schematically showing another example of a status in which the alternative control is performed. As in the shown example, in a case where the performance of the radar 204 on the driving assistance control system 200 side has decreased, the second determiner 248 of the second control device 240 determines that the operating state of the radar 204 satisfies the predetermined condition. In this case, the traveling assistance controller 246 transmits the alternative control command signal to the first control device 140 through the second communication line L2. Receiving this, the traveling controller 148 performs the speed control or the steering control using the viewfinder 104 having a function that is the same as or similar to a function of detecting the position of an object of the radar 204.

On the other hand, in a case where the performance of the viewfinder 104 on the autonomous driving control system 100 side has decreased, the first determiner 152 of the first control device 140 determines that the operating state of the viewfinder 104 satisfies the predetermined condition. In this case, the traveling controller 148 transmits the alternative control command signal to the second control device 240 through the second communication line L2 or the first communication line L1. Receiving this, the traveling assistance controller 246 performs the speed control or the steering control using the radar 204 having a function that is the same as or similar to a function of the viewfinder 104. Meanwhile, a relationship between the first camera 102 and the second camera 202 is the same as a relationship between the viewfinder 104 and the radar 204.

Meanwhile, in the above description, in a case where the alternative control command signal has been received when control performed by each ECU is performed, the traveling assistance controller 246 prioritizes control performed by the ECU rather than control of its own, but there is no limitation thereto. For example, the traveling assistance controller 246 may change the order of priority of each control in accordance with the possibility of contact with an obstacle or the state of the host vehicle M.

According to the embodiment described above, it is determined whether the operating state of the actuator of each device on the autonomous driving control system 100 side (or the driving assistance control system 200 side) satisfies the predetermined condition. In a case where it is determined that the operating state of the actuator satisfies the predetermined condition, control of the actuator is limited as compared to a case where it is determined that the predetermined condition is not satisfied, the alternative control command signal is transmitted to the second control device 240 on the driving assistance control system 200 side (or the first control device 140 on the autonomous driving control system 100 side) through the second communication line L2, and a control device having received this controls the actuator of each device on the host system side, to thereby perform traveling control of the host vehicle M in place of at least a portion of a function of a control device on another system side. Thereby, it is possible to use a redundant configuration, and to continue the traveling control stably.

In addition, according to the above-described embodiment, a device and a sensor which are control targets and a bus to which these are connected are independent of each other between the autonomous driving control system 100 and the driving assistance control system 200. Therefore, for example, even in a case where the detection performance of a sensor on the autonomous driving control system 100 side decreases or the performance of an actuator decreases, alternative control for traveling control to be originally performed by the autonomous driving control system 100 on the driving assistance control system 200 side can be performed without influencing the driving assistance control system 200.

In addition, according to the above-described embodiment, in a case where even any one of actuators of a plurality of devices satisfies the predetermined condition in each system, control of actuators of all the devices in the system is stopped (limited), and thus the traveling control of the host vehicle M can be performed using a simple control method. As a result, it is possible to reduce the processing load of the entire vehicle control system 1.

In addition, according to the above-described embodiment, in a case where the alternative control command signal is not transmitted from the other control device to one control device, and the other control device controls a certain actuator, one control device limits the operation of an actuator having a function that is the same as or similar to that of an actuator controlled by the other control device, and thus the same actuator is not to be controlled in both systems. As a result, control interference does not occur, and thus it is possible to continue the traveling control more stably.

In addition, according to the above-described embodiment, each system operates using power supplied from a separate independent power supply, and thus even in a case where the performance of one power supply has decreased, the traveling control can be continued by a system connected to the other power supply as a backup.

In addition, according to the above-described embodiment, in a case where the vehicle behavior stabilization device 210 is controlled by the camera ECU 202a or the radar ECU 204a, the traveling assistance controller 246 prioritizes control performed by the camera ECU 202a or the radar ECU 204a, or changes the order of priority of each control in accordance with the possibility of contact with an obstacle or the state of the host vehicle M. Therefore, since the vehicle behavior stabilization device 210 is controlled (mediated) as alternative control according to the alternative control command signal at a point in time when the prioritized control is terminated, the behavior of a vehicle is stabilized rapidly, it is possible to further suppress the occurrence of control interference. As a result, it is possible to continue the traveling control more stably.

Modification Example

Hereinafter, a modification example of the above-described embodiment will be described. In the above-described embodiment, a case where the object recognition device 106, the first vehicle sensor 108, and the recommended lane decision device 120 are connected directly to the first control device 140 has been described, but there is no limitation thereto. For example, the object recognition device 106, the first vehicle sensor 108, and the recommended lane decision device 120 may be connected to the first bus BS1.

Figure 12:
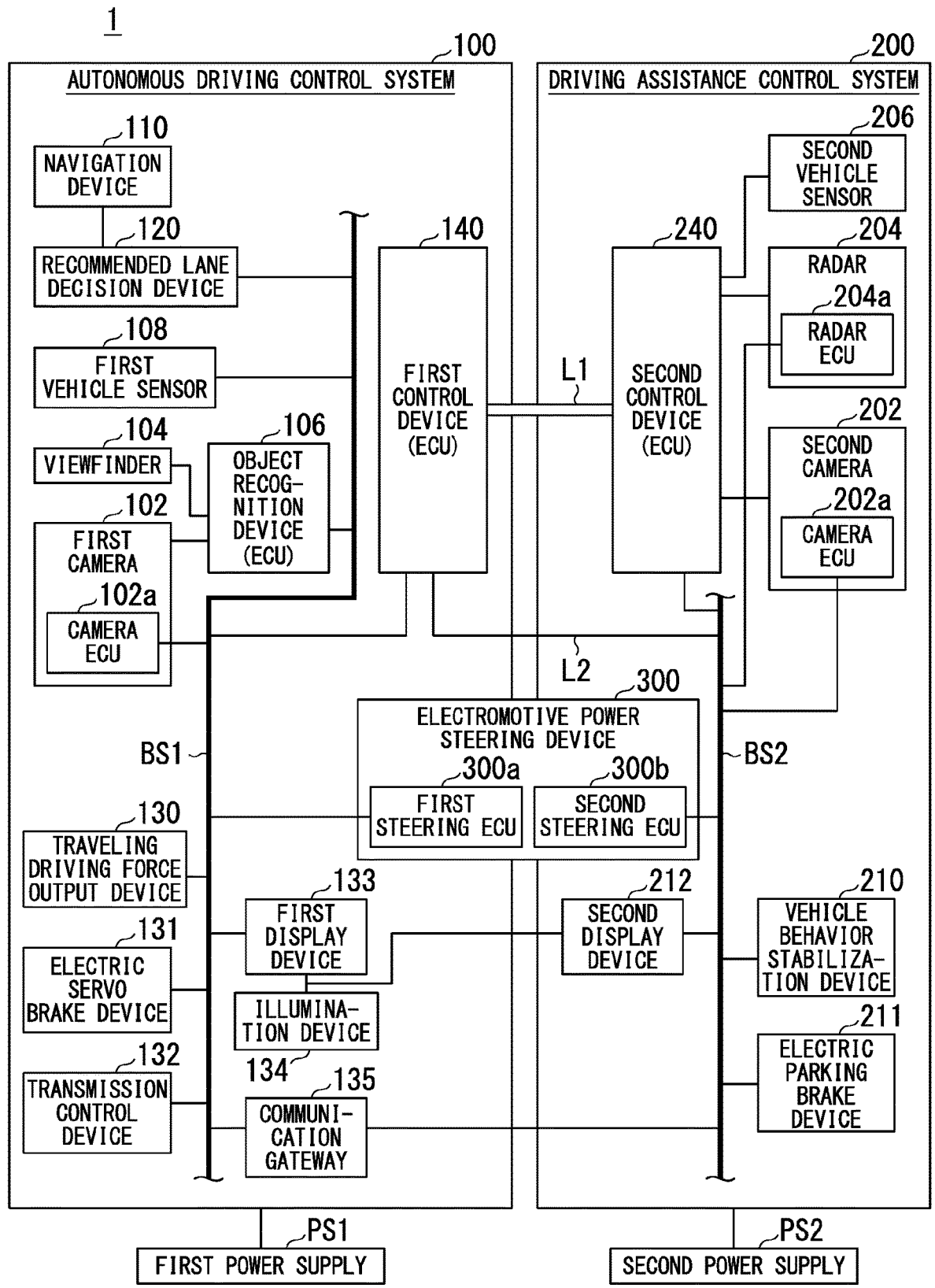
FIG. 12 is a configuration diagram of a vehicle control system 1 of a modification example of the embodiment.

FIG. 12 is a configuration diagram of a vehicle control system 1 of a modification example of the embodiment. As in the shown example, the object recognition device 106, the first vehicle sensor 108, and the recommended lane decision device 120 are connected to the first bus BS1. In this case, the first control device 140 acquires various types of information from these devices through the first bus BS1. In a case where the alternative control command signal is not received from the driving assistance control system 200 side, and any of a sensor and an actuator on the autonomous driving control system 100 side does not satisfy the predetermined condition, the first control device 140 transmits various types of information, acquired through the first bus BS1, to the second control device 240 through the first communication line L1. Thereby, the second control device 240 can share various types of information used in the first control device 140.

In addition, the communication gateway 135 may transmit information, output to the first bus BS1 by the object recognition device 106, the first vehicle sensor 108, and the recommended lane decision device 120, directly to the second bus BS2 on the driving assistance control system 200 side without going through the first control device 140.

Meanwhile, in the above-described example, a method of transmitting information from the autonomous driving control system 100 side to the driving assistance control system 200 side has been described, but the same is true of a method of transmitting information from the driving assistance control system 200 side to the autonomous driving control system 100 side. That is, in a case where the alternative control command signal is not received from the autonomous driving control system 100 side, and any of a sensor and an actuator on the driving assistance control system 200 side does not satisfy the predetermined condition, the first control device 140 may transmit various types of information, acquired through the second bus BS2, to the first control device 140 through the first communication line L1, or the communication gateway 135 may transmit information, output to the second bus BS2 by the second camera 202, the radar 204, and the second vehicle sensor 206, directly to the first bus S1 on the autonomous driving control system 100 side without going through the second control device 240.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

DESCRIPTION OF REFERENCE NUMERALS

1 Vehicle control system
100 Autonomous driving control system
102 First camera
102a Camera ECU
104 Viewfinder
106 Object recognition device
108 First vehicle sensor
110 Navigation device
112 Communicator
114 HMI
116 GNSS receiver
118 Navigation controller
120 Recommended lane decision device
130 Traveling driving force output device
131 Electric servo brake device
132 Transmission control device
133 First display device
134 Illumination device
135 Communication gateway
140 First control device
142 First outside recognizer
144 First host vehicle position recognizer
146 Behavior plan generator
148 Traveling controller
150 Switching controller
152 First determiner
BS1 First bus
200 Driving assistance control system
202 Second camera
202a Camera ECU
204 Radar
204a Radar ECU
206 Second vehicle sensor
210 Vehicle behavior stabilization device
211 Electric parking brake device
212 Second display device
240 Second control device
242 Second outside recognizer
244 Second host vehicle position recognizer
246 Traveling assistance controller
248 Second determiner
BS2 Second bus
300 Electromotive power steering device
300a First steering ECU
300b Second steering ECU
PS1 First power supply
PS2 Second power supply

What is claimed is:
1. A vehicle control system comprising:
a detector that is configured to detect behavior of a host vehicle, the behavior comprising slipping, wheel idling, or skidding;
a first actuator that is configured to perform at least any of driving, braking, or steering of the host vehicle;
a first controller that is configured to perform traveling control of the host vehicle by controlling the first actuator;
a second actuator that is configured to perform at least any of driving, braking, or steering of the host vehicle;

a second controller that is configured to perform traveling control of the host vehicle by controlling the second actuator;
a communication line that is interposed between the first controller and the second controller; and
an electronic control unit that is configured to decelerate the host vehicle and suppress the slipping, the wheel idling, or the skidding of the host vehicle by controlling the first actuator or the second actuator in accordance with the behavior detected by the detector,
wherein the first controller is configured to
   determine whether an operating state of the first actuator satisfies a predetermined condition, and
   limit, in a case where it is determined that the operating state of the first actuator satisfies the predetermined condition, control of the first actuator as compared to a case where it is determined that the predetermined condition is not satisfied, and transmit a predetermined signal to the second controller through the communication line,
wherein, in a case where the predetermined signal is received from the first controller through the communication line, the second controller performs traveling control of the host vehicle in place of at least a portion of a function of the first controller by controlling the second actuator, and
wherein, in a case where the predetermined signal is received from the first controller through the communication line and the second actuator is controlled by the electronic control unit, the second controller is configured to prioritize control of the second actuator performed by the electronic control unit and control the second actuator according to the predetermined signal at a point in time when the control of the second actuator performed by the electronic control unit is terminated.

2. The vehicle control system according to claim 1, wherein the first actuator includes two or more driving actuators that are configured to drive the host vehicle, a braking actuator that brakes the host vehicle, and a steering actuator that is configured to steer the host vehicle, and
   in a case where it is determined that an operating state of any of the actuators included in the first actuator satisfies the predetermined condition, the first controller is configured to limit an operation of the first actuator as compared to a case where it is determined that operating states of all the actuators included in the first actuator do not satisfy the predetermined condition.

3. The vehicle control system according to claim 1, further comprising:
   a first power supply that is configured to supply power to the first actuator; and
   a second power supply that is different from the first power supply, the second power supply supplying power to the second actuator,
wherein the second actuator includes two or more driving actuators that are configured to drive the host vehicle, a braking actuator that brakes the host vehicle, and a steering actuator that is configured to steer the host vehicle.

4. A vehicle control method comprising causing a first in-vehicle computer to:
   perform traveling control of a host vehicle by controlling a first actuator that is configured to perform at least any of driving, braking, or steering of the host vehicle;
   determine whether an operating state of the first actuator satisfies a predetermined condition; and
   limit, in a case where it is determined that the operating state of the first actuator satisfies the predetermined condition, control of the first actuator as compared to a case where it is determined that the predetermined condition is not satisfied, and transmit a predetermined signal to a second in-vehicle computer connected to a communication line that is interposed between the first in-vehicle computer and the second in-vehicle computer through the communication line,
the method further comprising causing a third in-vehicle computer to
   decelerate the host vehicle and suppress slipping, wheel idling, or skidding of the host vehicle by controlling the first actuator or the second actuator in accordance with a behavior detected by a detector, the detector that is configured to detect behavior of the host vehicle, the behavior including the slipping, the wheel idling, or the skidding,
the method further comprising causing the second in-vehicle computer to
   perform traveling control of the host vehicle by controlling a second actuator that is configured to perform at least any of driving, braking, or steering of the host vehicle,
   perform traveling control of the host vehicle in place of at least a portion of a function of the first in-vehicle computer by controlling the second actuator that is configured to perform at least any of driving, braking, or steering of the host vehicle in a case where the predetermined signal is received from the first in-vehicle computer through the communication line, and
   prioritize control of the second actuator performed by the third in-vehicle computer and control the second actuator according to the predetermined signal at a point in time when the control of the second actuator performed by the third in-vehicle computer is terminated in a case where the predetermined signal is received from the first in-vehicle computer through the communication line and the second actuator is controlled by the third in-vehicle computer.

* * * * *